United States Patent
Takezaki

[11] Patent Number: 5,880,704
[45] Date of Patent: Mar. 9, 1999

[54] THREE-DIMENSIONAL IMAGE DISPLAY DEVICE AND RECORDING DEVICE

[75] Inventor: Koichi Takezaki, Kawasaki, Japan

[73] Assignee: Fujitsu Limited, Kanagawa, Japan

[21] Appl. No.: 294,732

[22] Filed: Aug. 23, 1994

[30] Foreign Application Priority Data

Sep. 24, 1993 [JP] Japan .................................. 5-238542

[51] Int. Cl.$^6$ .................................................. G09G 5/00
[52] U.S. Cl. .................................. 345/6; 348/51; 348/56
[58] Field of Search ........................ 345/5.6, 108, 109, 345/110, 139; 395/119; 348/51, 55, 56

[56] References Cited

U.S. PATENT DOCUMENTS

| | | | |
|---|---|---|---|
| 4,729,017 | 3/1988 | Sayanagi et al. | 345/6 |
| 4,959,641 | 9/1990 | Bass et al. | 345/139 |
| 5,132,839 | 7/1992 | Travis | 359/462 |
| 5,148,310 | 9/1992 | Batchko | 345/139 |
| 5,311,220 | 5/1994 | Eichenlaub | 348/55 |
| 5,315,377 | 5/1994 | Isono et al. | 348/51 |

FOREIGN PATENT DOCUMENTS 4-67677  3/1992  Japan .

*Primary Examiner*—Richard A. Hjerpe
*Assistant Examiner*—Kent Chang
*Attorney, Agent, or Firm*—Staas & Halsey

[57] ABSTRACT

A three-dimensional image display device comprises a screen shutter unit, a shutter control unit, a display unit, and a display control unit. The screen shutter unit comprises a plurality of long and narrow shutters capable of passing and intercepting light rays. Each of the shutters is positioned vertically and arranged horizontally to each other at equal intervals. The shutter control unit selects shutters from the plurality of shutters at predetermined intervals as long slits to pass light rays through, and moves entire slits horizontally at predetermined time intervals. The display unit displays each image corresponding to each slit on an image display screen provided at a predetermined distance from an arrangement of the shutters. The display control unit displays as images corresponding to respective slits the images obtained by projecting a three-dimensional image to be displayed on the image display screen through the slits synchronously with a moving timing of the slits controlled by the shutter control unit. The images are displayed on respective positions on the image display screen corresponding to respective slits. A part of the image displayed on the image display screen corresponding to the slits is selected through the slits and reaches the viewer's eyes, thereby allowing the viewer to recognize the three-dimensional image.

18 Claims, 35 Drawing Sheets

FIG. 35
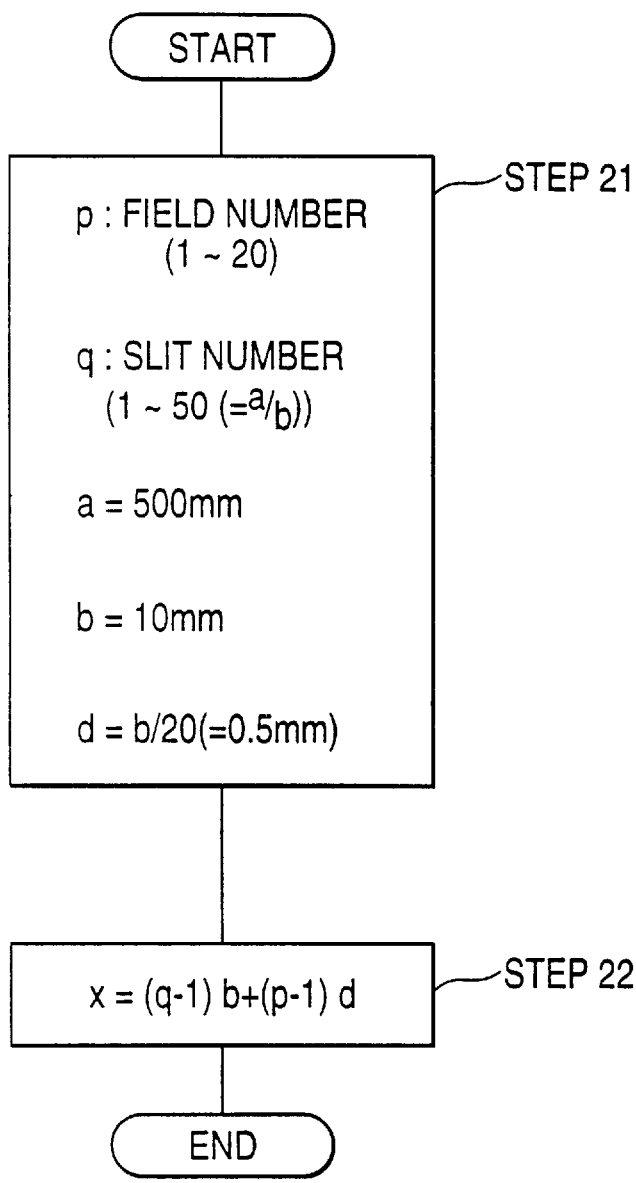
FIG. 36A
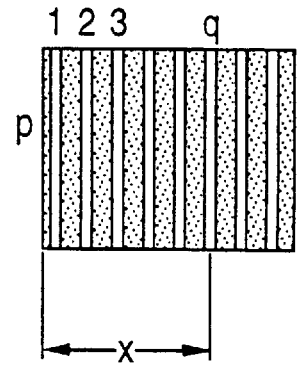
FIG. 36B
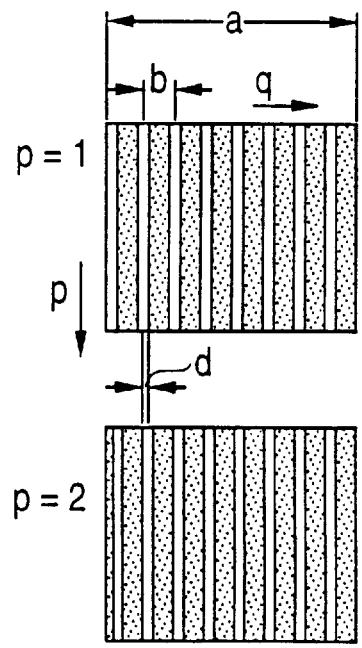
FIG. 36C

THREE-DIMENSIONAL IMAGE DISPLAY DEVICE AND RECORDING DEVICE

BACKGROUND OF THE INVENTION

1. Field of the Invention

The present invention relates to a three-dimensional image display device for displaying three-dimensional image data and a three-dimensional image recording device for capturing, recording, and regenerating a three-dimensional object for display.

2. Description of the Related Art

Recently, a variety of image displaying technologies have enabled an object to be displayed in three dimensions. For example, two images to be captured separately by a left eye and a right eye are given to respective eyes to regenerate the three-dimensional image of an object. The effect of the three-dimensional image is based on the difference in vision between the left and right eyes, and can be obtained both with and without glasses. Methods using glasses are: the wave-length separating method in which left and right images are separated through the difference in wave length of light, that is, red and blue color glasses are used; the polarization separating method in which images are separated by polarization glasses for separating images based on the difference in light polarization state; and the time divisional separating method in which left and right images are separated through glasses while being alternately displayed in time-division manner. These methods are applied to movies, TV, video, and other display devices.

Methods without glasses are: the parallax barrier method in which images corresponding to left and right eyes are alternately and divisionally displayed on a display screen as long and narrow strips with a vertical static slit barrier positioned before the screen; and the lenticular method in which long semi-cylindrical lenses are arranged horizontally from left to right and a divisional display screen is provided at the position of the lens focus to display images corresponding to left and right eyes.

Other methods than those depending on the difference in vision are technologies of generating a spatial image and displaying it in three dimensions. For example, a technology of recording and regenerating a three-dimensional image using a hologram, a technology of integral photography using fly's eyes lens in which a number of small convex lenses are spread all over a plane; or a pin hole panel in which a number of pin holes are used instead of convex lenses.

A three-dimensional image is demanded in various industrial fields such as designing three-dimensional structures, three-dimensional molecular structures, technical trainings with three-dimensional pictures and images, etc. in addition to the demand as amusement media such as TV, movies, video, etc.. Now demanded is a three-dimensional image which not only appears as an illusion as if it were a three-dimensional image but also can be realized as a true three-dimensional object by being observed from various directions, and as colored and dynamic image.

The above described a three-dimensional image displaying technologies have respective problems as follows.

(1) In the method of displaying a three-dimensional image based on the difference in vision between left and right eyes, the displayed image is not really a three-dimensional image, but simply appears as if it were a three-dimensional image. Therefore, the image cannot appear in three dimensions from all directions by being viewed from above or below, or from its left or right side as can a hologram. That is, the positional correlation between a viewer and the screen is limited to a specified narrow scope (lenticular method and parallax barrier method), or a good three-dimensional image requires that the line connecting the left and the right eyes should be parallel with the horizontal direction of the screen in the polarization filter method). Therefore, the viewer cannot see the image in a natural posture. Additionally, since the viewer must wear immediately before his or her eyes the glasses of filters (red-and-blue filters, polarization filter, time-division filters, etc.) to separate the images for respective eyes, they are actually annoying to the viewer. These glass-type filters are not required by the lenticular method which uses a special lens plate immediately before a screen or the parallax barrier method which uses a barrier with slits.

(2) In the three-dimensional image displaying method using holograms, an image is calculated, constructed, and recorded by a computer as optical interference fringes. It is a very complicated procedure and takes an unpractically long processing time. Furthermore, it is very difficult to display dynamic images requiring much more image data than static images. The optical interference further complicates a displaying of colored images.

(3) In the integral photographic method, the precision of lenses must be identically maintained between recording and regenerating times in dimension, installation, and position relative to a facing screen. Thus, it is technically difficult to use this method successfully. Furthermore, since the focal depth is small, also small is the depth of an image clearly regenerated from a photographically recorded image. Additionally, this method does not assure the perfect reproductivity of images because the directions of the rays emitted from respective parts of an object can be recorded only partially.

SUMMARY OF THE INVENTION

The object of the present invention is to solve the above described problems of the conventional methods and to provide, for practical use, a three-dimensional image displaying device and recording device for having a plurality of viewers recognize a natural three-dimensional image without special glasses.

According to the present invention, the three-dimensional image display device comprises a display unit for displaying an image, a display control unit for controlling the display unit, a screen shutter unit comprising a plurality of long and narrow vertical slits arranged horizontally from left to right, and a shutter control unit for controlling the screen shutter unit. The screen shutter unit and the display unit face each other at a given distance. The slits are provided in the screen shutter unit and can be moved horizontally. When a three-dimensional image is displayed, the slits are moved horizontally. Images are displayed on the display unit corresponding to the positions of respective slits so that they are viewed by a viewer. Each of the slits and corresponding images partially regenerates the intensity and direction of the ray from a three-dimensional object image. Furthermore, the slits are moved horizontally so that the intensity and direction of the rays from the entire three-dimensional image can be regenerated while the rays first reaching the viewer's eyes still remain as an afterimage, thus allowing the viewer to recognize the three-dimensional image. According to the present invention, a plurality of slits are generated and therefore, each of them is moved by only a short distance to regenerate the rays from an entire three-dimensional image, thereby quickly regenerating the three-dimensional image. A large amount of the rays passing through the slits per unit time guarantee a viewer the brightness of the screen without exceedingly brightening the image display screen. Relating to the resolution, the slits ideally should be moved in series. However, when, for example, a liquid crystal is practically used and the speed of the slits is not sufficiently high, the slits are moved at intervals to cover the entire screen. By contrast, since the present invention uses a plurality of slits to make the moving distance of each slit smaller, the slits are moved almost in series, thereby improving the resolution and the quality of regenerated images.

Furthermore, a three-dimensional image recording device can also be provided based on the same principle according to the present invention. The three-dimensional image recording device comprises a screen shutter unit, a shutter control unit, a recording unit for recording the rays which have passed through the slits, a recording control unit, and a ray path restricting unit. When the recording unit captures an object, the screen shutter unit is placed toward the object. The slits move horizontally and the recording unit and the recording control unit record the image of the object and the positions of the slits correspondingly. Thus, the captured three-dimensional images are regenerated by the three-dimensional image display device.

As described above, the present invention provides a practical three-dimensional image display and recording devices.

The above listed objects and features of the present invention will be explained below in detail by referring to the attached drawings.

BRIEF DESCRIPTION OF THE DRAWINGS

One skilled in the art can easily understand additional features and objects of this invention from the description of the preferred embodiments and some of the attached drawings. In the drawings:

FIG. 35 is the flowchart practically showing the process in step 15 (setting the x coordinate of the position of the object slit) shown in FIG. 34; and FIGS. 36A–36C are slit position diagrams.

DETAILED DESCRIPTION OF THE PREFERRED EMBODIMENTS

Figure 1A:
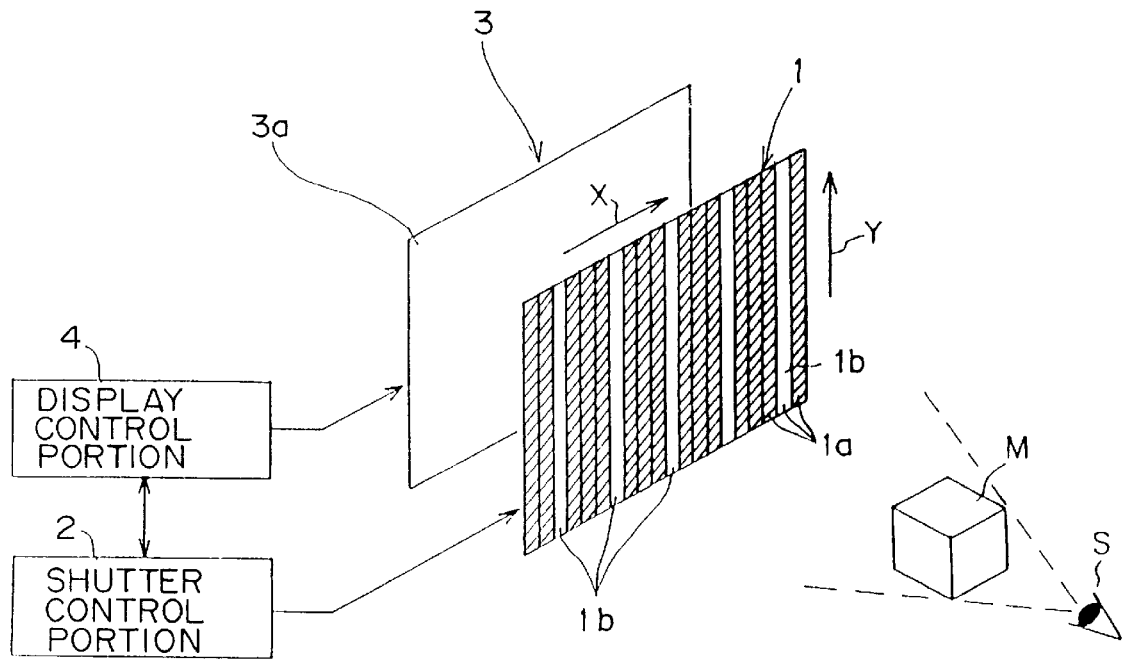
FIG. 1A shows the configuration showing the principle of the three-dimensional image display device of method 1 according to the present invention.

FIG. 1A shows the configuration indicating the principle of the three-dimensional image displaying device of the present invention. As shown in FIG. 1A, the device comprises a screen shutter unit 1, a shutter control unit 2, a display unit 3, and a display control unit 4. Although FIG. 1A shows an example of a case in which a three-dimensional image M to be displayed is positioned between the screen and a viewer, it obviously can be positioned beyond or at the screen.

The screen shutter unit 1 comprises a plurality of shutters (1a, 1a, . . . ) each of which is a long narrow shutter strip 1a to transmit or intercept rays and is positioned in parallel with the vertical direction of the screen (indicated by arrow Y) and at equal intervals along the horizontal direction of the screen (indicated by arrow X). The shutters can be a set of electronic shutters made of, for example, liquid crystal, ceramics, etc.

The shutter control unit 2 drives the screen shutter unit 1, controlling as long and narrow ray passing slits 1b only a plurality of shutters selected at predetermined intervals from the shutters (1a, 1a, . . . ). The entire position of the slits (1b, 1b, . . . ) comprising a plurality of slits is moved horizontally at a specified time intervals.

The display unit 3 displays sections of an image each section separately corresponding to a slit 1b on an image display screen 3a positioned at a specified distance from the arrangement of the shutters (1a, 1a, . . . ). The display unit 3 can be one of various well-known image display devices such as a CRT display device, a liquid crystal display device, an electro-luminescent (EL) display device, a plasma display device, etc. A transparent spacer of a given thickness can be interposed between them so as to maintain a constant space between the image display screen 3a of the display unit 3 and the arrangement of the shutters of the screen shutter unit 1.

Figure 1B:
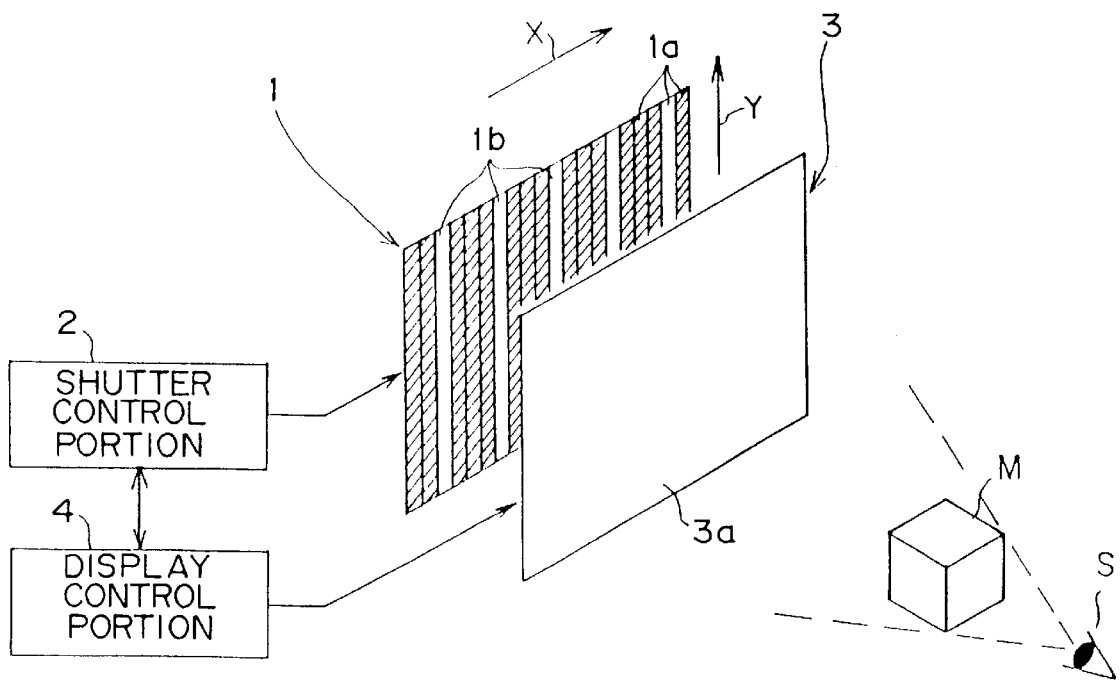
FIG. 1B shows the configuration showing the principle of the three-dimensional image display device of method 2 according to the present invention.

The display control unit 4 synchronizes with the movement of the slits (1b, 1b, . . . ) controlled by the shutter control unit 2. An image obtained by projecting a three-dimensional image M of a display object on the image display screen 3a through the above described slits is displayed as an image corresponding to the slits (1b, 1b, . . . ) at positions on the image display screen 3a with the positions corresponding to respective slits (1b, 1b, . . . ) moving synchronously as described above. The "image obtained by projecting a three-dimensional image M of a display object on the image display screen 3a through the slits" can be obtained whatever the positional correlation among the three-dimensional image M, the slits 1b, and the image display screen 3a is. For example, if the three-dimensional image M to be displayed is positioned in front of the arrangement of the slits 1b beyond which the image display screen 3a is positioned as shown in FIG. 1A, then the image is projected on the image display screen 3a after the rays emitted from the three-dimensional image M has passed through the slits 1b. If the three-dimensional image M is positioned on the same side as the image display screen 3a relative to the arrangement of the slits 1b as shown in FIG. 1B, then the image is projected on the image display screen 3a before the rays emitted from the three-dimensional image M have passed through the slits 1b. The representation "image" obviously contains an image obtained by artificially generating it as if the rays were emitted from the three-dimensional image M using a computer graphics (CG).

With the configuration above, a viewer can recognize a three-dimensional image by seeing with his or her eyes S the parts of the image to be displayed on the image display screen 3a corresponding to the slits 1b through the slits 1b, because of horizontally regenerating the direction of rays.

The display unit 3 can be a self-emitting display device, for example, a back-light liquid crystal display device, a CRT display device, an EL display device, a plasma display device, etc., for emitted rays to display an image. Otherwise, it can be a pass-through display device, for example, a pass-through liquid crystal, for displaying an image by having the ray from a light source mounted behind the image display screen 3a filtered by the image display screen 3a and selectively pass through the image display screen 3a. If a self-emitting display device is selected, the screen shutter unit 1 is interposed between the image display screen 3a and a viewer, and a part of the rays emitted by the image display screen 3a reach the viewer's eyes S through respective slits 1b as shown in FIG. 1A. If a pass-through display device is selected as shown in FIG. 1B, the screen shutter unit 1 is interposed between the image display screen 3a and a light source (not shown in FIG. 1B) behind the screen and only a part of the rays from the light source reach the viewer's eyes S via the image display screen 3a through the respective slits 1b. With the configuration shown in FIG. 1A, a light source and the pass-through display device can be combined to be used as in the case of the self-emitting device and therefore be inclusively referred to as a self-emitting unit. Thus, the above described back-light liquid crystal display device is also referred to as a self-emitting unit.

Figure 2:
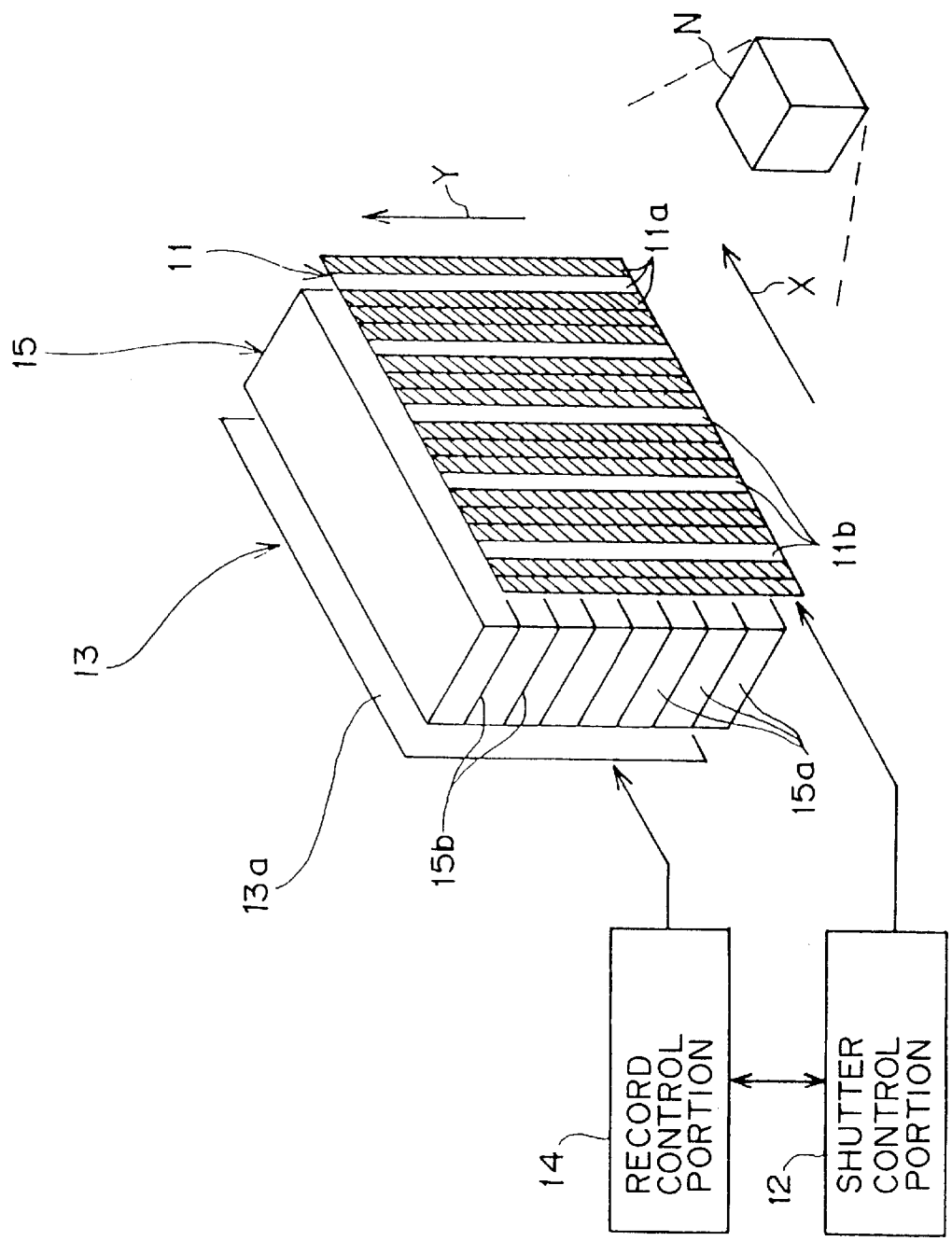
FIG. 2 shows the configuration showing the principle of the three-dimensional image recording device according to the present invention.

Next, FIG. 2 shows the configuration of the principle of the three-dimensional image recording device according to the present invention. The device comprises a screen shutter unit 11, a shutter control unit 12, a recording unit 13, a record control unit 14, and a ray path restricting unit 15 as shown in FIG. 2.

The screen shutter unit 11 comprises a plurality of shutters (11a, 11a, . . . ) each of which is a long narrow shutter strip 1a to transmit or intercept rays and is positioned in parallel with the vertical direction of the screen (indicated by arrow Y) and at equal intervals along the horizontal direction of the screen (indicated by arrow X). The shutters can be a set of electronic shutters made of, for example, liquid crystal, ceramics, etc.

The shutter control unit 12 drives the screen shutter unit 11, controlling as long and narrow ray passing slits 11b only a plurality of shutters selected at predetermined intervals from the shutters (11a, 11a, . . . ). The entire position of the slits (11b, 11b, . . . ) comprising a plurality of slits is moved horizontally at a specified time intervals.

The recording unit 13 records sections of an image each section separately corresponding to a slit 11b on an image record screen 13a positioned at a specified distance from the arrangement of the shutters (11a, 11a, . . . ). The recording unit 13 can be, for example, a photoelectric conversion element having a two-dimensional optical-receiving surface such as a charge-coupled device (CCD).

The record control unit 14 synchronizes with the movement of the slits (11b, 11b, . . . ) controlled by the shutter control unit 12. An image obtained by projecting a three-dimensional image N of a recorded object on the image record screen 13a through the above described slits is recorded as an image corresponding to the slits 11b, 11b, .

... at positions on the image record screen 13a with the positions corresponding to respective slits 11b, 11b, . . . of the slits moving synchronously as described above.

The ray path restricting unit 15 comprises a pile of a plurality of transparent plates 15a each having two opposite parallel planes which are boundaries 15b between the plates. The pile of the plates are interposed between the arrangement of the shutters (11a, 11a, . . . ) and the image record screen 13a such that the boundaries 15b make a right angle with the arrangement and the image record screen 13a of the recording unit 13. With the configuration, only the rays passing through the slits perpendicularly to the length of the slit 11b can reach the image record screen 13a. The ray path restricting unit 15 can also be used as a spacer for maintaining a constant space between the image record screen 13a of the recording unit 13 and the arrangement of the shutters of the screen shutter unit 11.

With the configuration above, each image recorded by the recording unit 13 is displayed on the display unit 3 of the three-dimensional image display device shown in FIGS. 1A or 1B so that the three-dimensional image of the three-dimensional object N can be regenerated and displayed on the three-dimensional image display device. Furthermore, a lens can be interposed between the arrangement of the shutters (11a, 11a, . . . ) and the three-dimensional object N so that the lens may be used in determining the coverage angle relative to the vertical direction (indicated by arrow Y).

The following explanation is given to describe further in detail the principle of the slits used in the present invention.

Generally, when an image is recognized in three dimensions, the ray emitted from every part of a display object, as being viewed from every direction, must ideally be regenerated and displayed in color, brightness, and direction. Especially, relating to the direction of rays, the three-dimensional image can be recognized by regenerating only horizontal rays in consideration of the structure of our eyes designed to see an object in three dimensions. Therefore, the present invention does not relate to the vertical direction of rays, but regenerates and records horizontal rays only.

Figure 3:
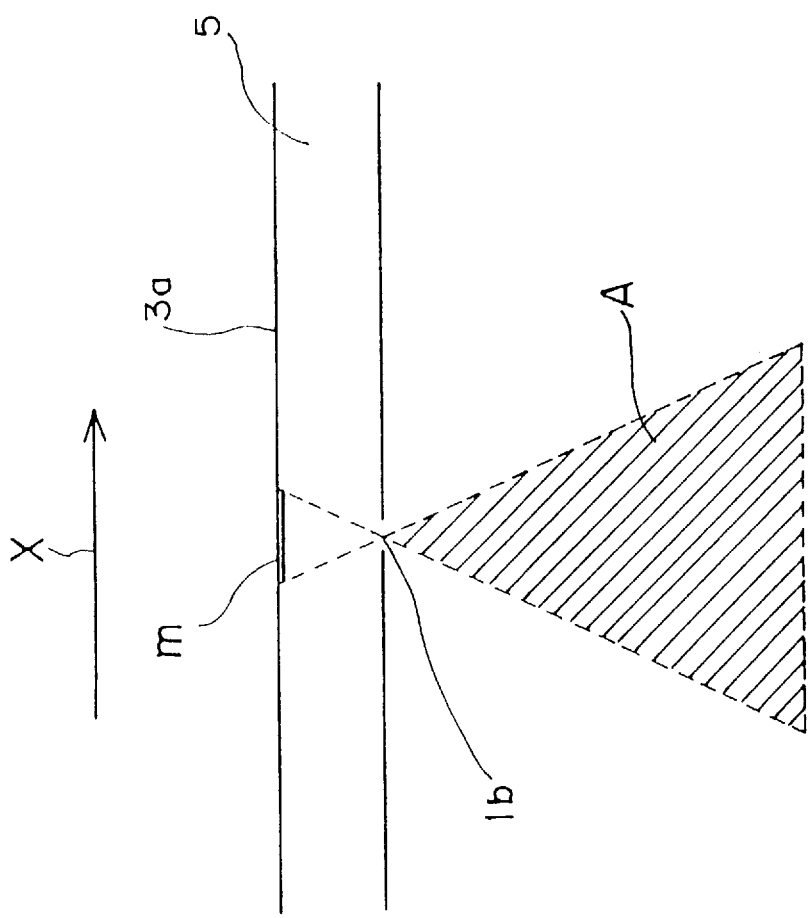
FIG. 3 shows the principle of displaying an image using a single slit.

As is practically realized by a pin-hole camera, the direction of a ray is regenerated and recorded by taking advantage of the linearity of rays. The ray from each part of the screen is recorded and regenerated after passing through a narrow space and being projected on the screen. To regenerate horizontal rays only, a vertically long slit 1b shown in FIG. 3 is used as a narrow space to pass rays through. Since FIG. 3 is the top view of the slit 1b, it does not indicate the vertically long characteristic of the slit 1b. In FIG. 3, the shadowed area A indicates the scope from which the rays from image m can be viewed through the slit 1b. Thus, the vertically long slit 1b permits the rays from the image on the screen to be completely obtained in the vertical direction, thereby presenting a brighter display screen.

If an image m is viewed on the image display screen 3a through the slit 1b, a part of the rays emitted from a three-dimensional image can be recognized by horizontally (in the direction indicated by arrow X) changing the position from which the image is viewed. The position of the slit 1b can be moved instead of changing the position of viewers' eyes, and the image corresponding to the moved slit can be displayed on the image display screen 3a. As a result, the rays from the three-dimensional image are recognized as an entire image through the respective slits. At this time, since the positions of the viewer's eyes are obviously different from each other, two different images are recognized, thereby generating the effect of three-dimensional vision. The horizontally movable slits are hereinafter referred to as variable slits.

Figure 4:
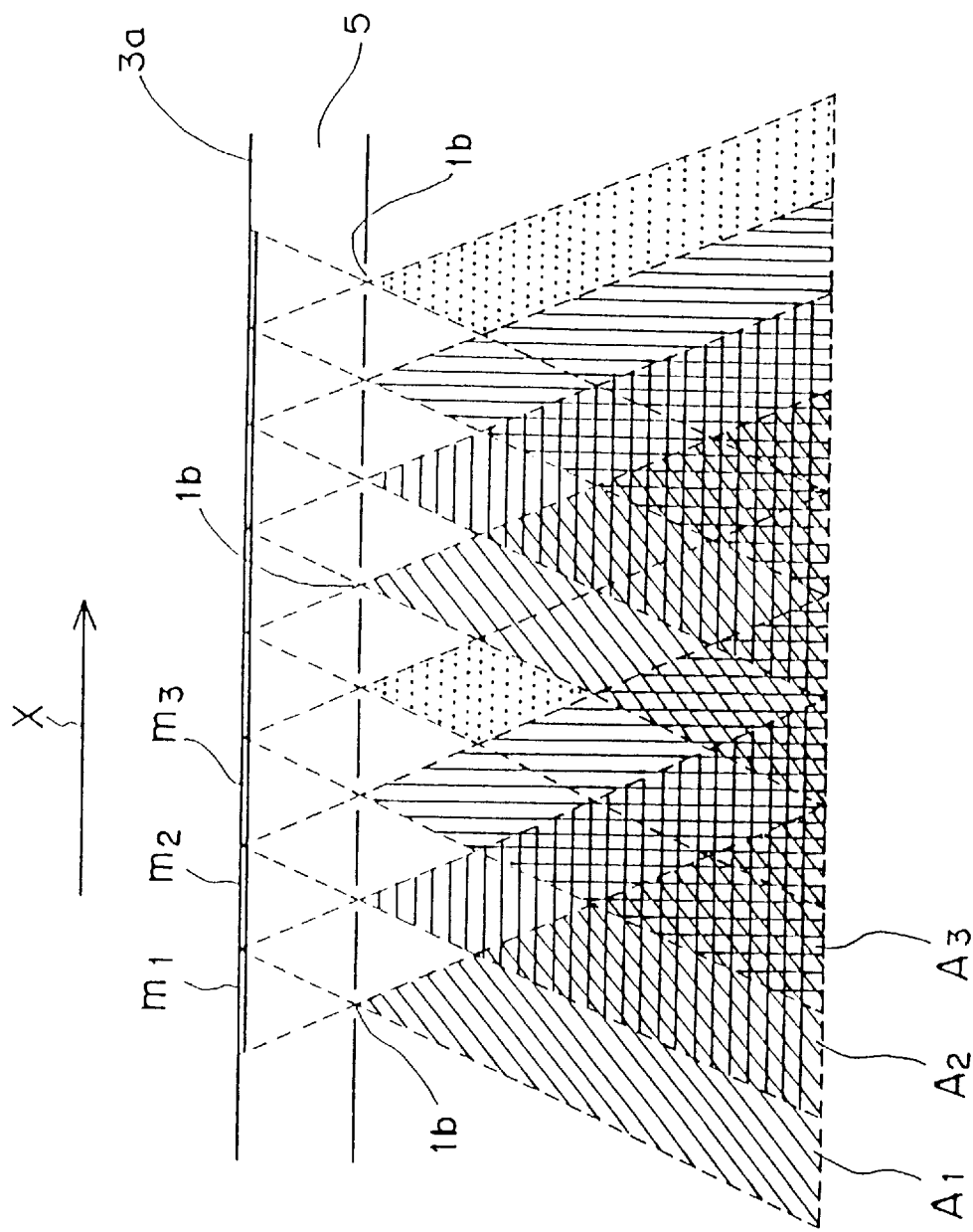
FIG. 4 shows the principle of displaying an image using a multi-slit.

As shown in FIG. 4, arranging at regular intervals a number of pairs of slits 1b and corresponding image sections on the image display screen 3a successively increases the amount of rays simultaneously reaching the eyes of a plurality of viewers, thereby extending the display of the rays. Thus, the slits (1b, 1b, . . . ) containing a plurality of slits arranged at specified intervals is hereinafter referred to as a multi-slit. In FIG. 4, shadowed areas $A_1$, $A_2$, $A_3$, etc. indicate the scopes from which the rays from images $m_1$, $m_2$, $m_3$, etc. respectively corresponding to the areas can be seen through the respective slits 1b. If a plurality of areas overlap at a point, then a viewer can see the ray passing through a plurality of slits at that point. The whole multi-slit can be moved left and right using a plurality of shutters capable of transmitting and intercepting rays, and is hereinafter referred to as et variable multi-slit screen shutter. The size of an image projected by the ray passing through respective slits can be adjusted by appropriately setting the refractive index of an area between the variable multi-slit screen shutter and the image display screen 3a (for example a spacer provided to maintain a space between them). Furthermore, the effective amount of rays reaching the viewer's eyes can be increased by synchronizing the movement of the plurality of slits arranged at specified intervals with the display of images corresponding respective slits. Moreover, such dynamic images as common TV images can be displayed by appropriately selecting a slit movement speed and its method.

Using these methods synthetically, three-dimensional colored images can be observed by a plurality of viewers simultaneously without special glasses. Furthermore, the left and right sides of a three-dimensional object can be viewed within a limited angle.

There are two methods of realizing the three-dimensional image display device according to the present invention. One is to use a self-emitting device as the display unit 3. In this case, the screen shutter unit 1 is provided in front of the display unit 3 (on the side of the viewer) as shown in FIG. 1A. Each image is displayed on the image display screen 3a and is viewed through the slits (1b, 1b, . . . ). This method is hereinafter referred to as method 1. In method 1, a three-dimensional image generated by a conventional computer graphics processing technology is viewed as a three-dimensional image without special glasses in a practical manner from respective positions of right and left eyes. The image can be viewed in mechanical precision similar to that of a lenticular lens method.

Another method is to use a pass-through display unit 3 as described above, and in this case the screen shutter unit 1 is positioned beyond the display unit 3 (on the opposite side of the viewer) as shown in FIG. 1B. A light source is located behind the screen shutter 1. The rays from the light source pass through the slits (1b, 1b, . . . ), thereby generating a long narrow strip of rays. Then, the rays of a cylindrical form emitted from the above described light are filtered through the color and brightness, etc. of the image displayed on the image display unit 3a of the display unit 3. As a result, the viewer sees the arriving rays. This method is referred to as method 2. In method 2 as well as method 1, a three-dimensional image is viewed as a three-dimensional image without special glasses in a practical manner from respective positions of right and left eyes. The image can be viewed in mechanical precision similar to that of a lenticular lens method.

The three-dimensional image display device according to the present invention regenerates not only a three-dimensional image generated through computer graphics but an image of a natural object captured by the three-dimensional image recording device according to the present invention. Especially according to method 2, an image captured by the three-dimensional image recording device can be easily regenerated without an additional process such as a back-to-front inversion, etc. The back-to-front inversion refers to an inversion of the front and the back of a three-dimensional image. For example, assuming that the three-dimensional image recording device according to the present invention captures a human face, his or her nose appears concave while his or her dimple appears convex if the recorded images are not otherwise processed when the images are displayed "as is" according to method 1. Method 2 is free of the problem.

Described below is the operation of the present invention by referring to each of the above mentioned methods.

Figure 5:
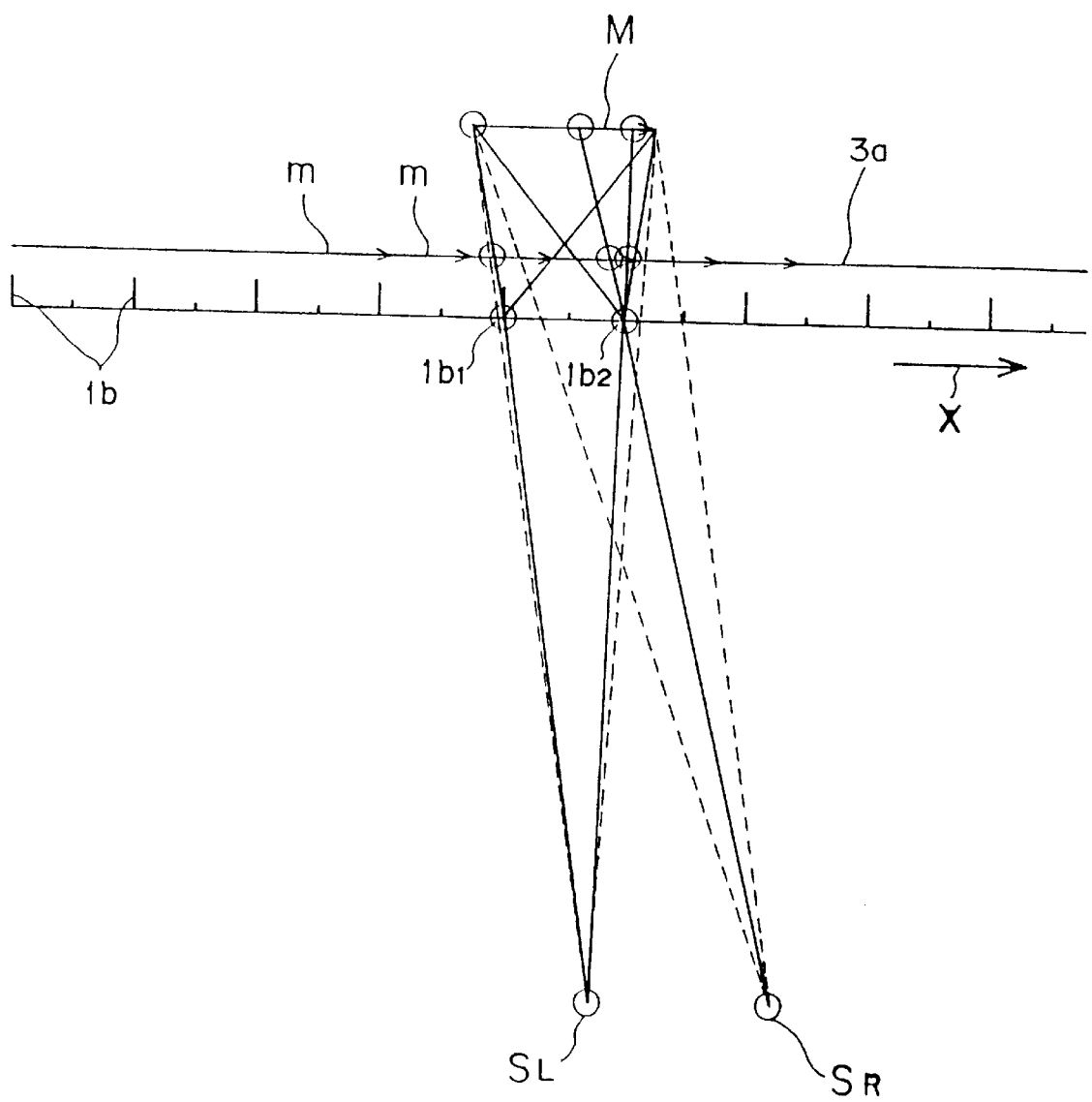
FIG. 5 shows the principle of displaying an image on the three-dimensional image display device of method 1.
Figure 6:
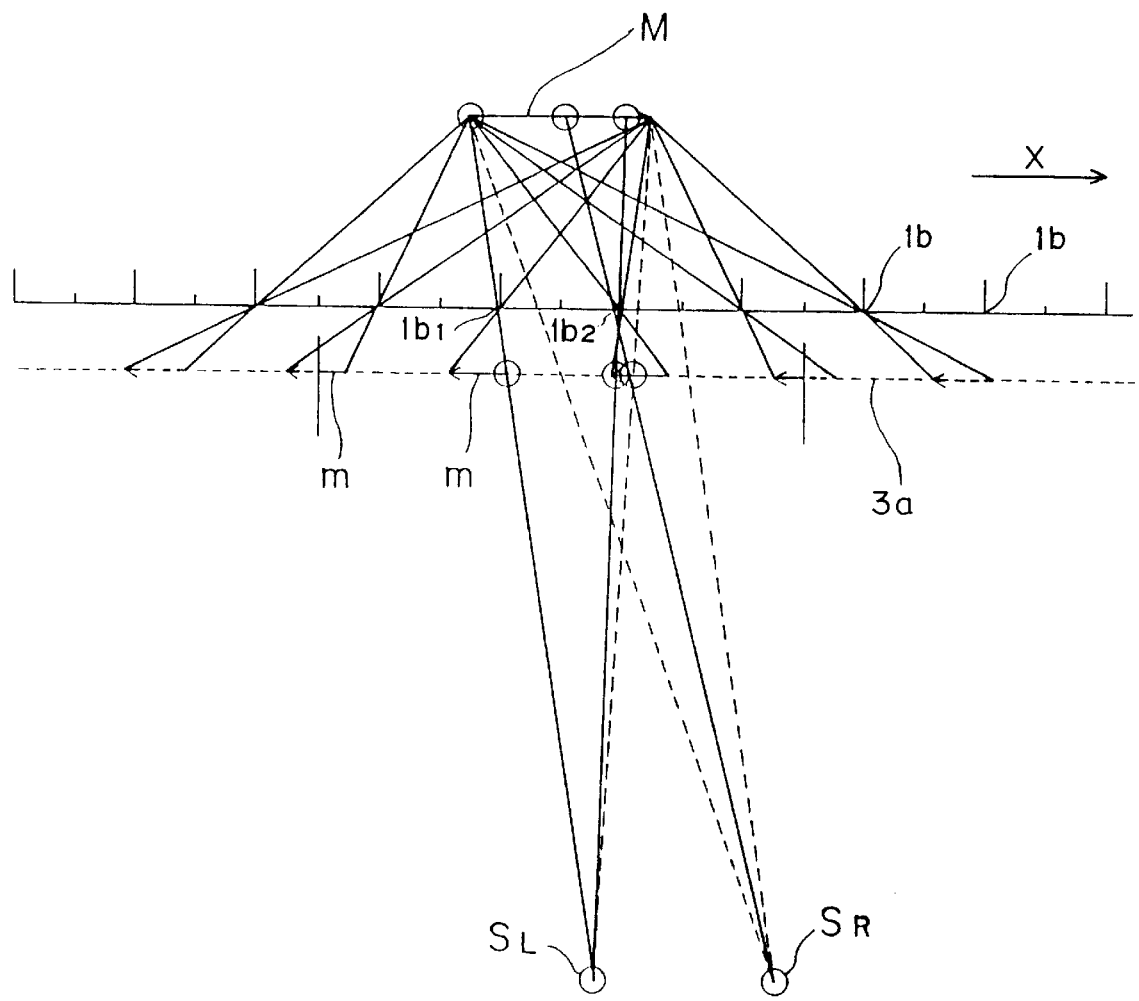
FIG. 6 shows the principle of displaying an image on the three-dimensional image display device of method 2.

FIG. 5 shows the correlation among the position of the slits ($1b, 1b, \ldots$), the position of image m corresponding to each slit, and the rays reaching the viewer's right and left eyes $S_R$ and $S_L$ in the three-dimensional image display device according to method 1. FIG. 6 shows the similar correlation in method 2. In the comparison between methods 1 and 2, the back/front position correlation between the slits ($1b, 1b, \ldots$) and the image display screen $3a$ is inverted between the two methods. Correspondingly, images M corresponding to respective slits are also inverted left-to-right. Nevertheless, the two methods are based on the same principle of displaying a three-dimensional image.

An image m corresponding to each slit is obtained by projecting a three-dimensional image M to be displayed (for example, a right-directing arrow behind the image display screen $3a$) on the image display screen $3a$ through each slit ($1b, 1b, \ldots$) as shown in FIGS. 5 and 6. The image m is displayed at the points on the image display screen $3a$ where the lines connecting the three-dimensional image M to slits ($1b, 1b, \ldots$) pass through. The broken lines connecting the left and right eyes $S_L$ and $S_R$ to both ends of the three-dimensional image M (both ends of the arrow) indicate that, among the rays emitted from the three-dimensional object image M, only the rays passing through the area encompassed by the broken lines reach the left and right eyes $S_L$ and $S_R$. Therefore, the rays from respective images m reach the eyes $S_L$ and $S_R$ as indicated by solid lines through the slits in the area encompassed by the broken lines. The rays indicated by the solid lines pass through the three-dimensional image M, the image display screen $3a$, and the slits $1b$, crossing them at the encircled points in FIG. 5. Thus, the point around the arrow tip of the three-dimensional image M corresponds to the same point of the image m on the image display screen $3a$. Likewise, the point around the arrow head of the three-dimensional image M corresponds to the same point of the image m on the image display screen $3a$. The rays from these points pass through slits $1b_1$ and $1b_2$ to reach the viewer's left eye $S_L$. The rays from the middle part of the three-dimensional image (arrow) M pass through slit $1b_2$, one of the above described slits, to reach the viewer's right eye $S_R$. That is, the rays simultaneously reaching the left and right eyes $S_L$ and $S_R$ trace 3 paths (actually, 3 luminous fluxes each having the width of the screen length).

If the rays simultaneously reaching the left and right eyes $S_L$ and $S_R$ trace 3 paths, the viewer can recognize 3 linear screens only. However, if an image is displayed in association with the slits moving horizontally (in the direction indicated by arrow X) at short time intervals, other points of the three-dimensional image M can be viewed by the left and right eyes $S_L$ and $S_R$ through the moving slits. As a result, the afterimage effect of the human eye makes the viewer recognize the object as a series of three-dimensional image. If another viewer sees the three-dimensional image M or the first viewer sees it from different positions of his or her eyes, the three-dimensional image M can be likewise captured, but as the same image from a different point of view.

Described below is the relationship between the recognition of a three-dimensional object by a human being and the display of a three-dimensional image based on an afterimage effect.

First, as it can be confirmed by viewing an object with left and right eyes alternately, an image viewed with a right eye (an image received by a right eye) is a little different from that viewed with a left eye (an image received by a left eye) depending on the difference in positions of the left and right eyes. That is, the right eye and the left eye view an object at different angles. The difference in visual angle of left and right eyes allows a viewer to recognize a three-dimensional object, that is, allows the convexity/concavity and obliqueness of the surface of the object to be represented in three dimensions. Therefore, even if there is no three-dimensional object existing actually before the eyes of a viewer, the viewer can recognize a three-dimensional image if two types of images (two-dimensional images) as being viewed at different visual angles are simultaneously received by the left and right eyes of the viewers. The present invention has been developed based on the above described principle. As a result, the viewer recognizes a three-dimensional image by separately capturing with his or her left and right eyes two types of images prepared as being viewed at different angles and displayed on a screen. However, according to the present invention, the images for the left and right eyes are not complete images but segmented images each being received through a slit (a small part of a complete image). In this case, even if images are received by left and right eyes through the same slit, the visual angles are different for right and left eyes. The right and left eyes receive different portions of an image (two-dimensional image) as being viewed at different angles. That is, a part of the two types of images viewed at different visual angles (two types of images which is captured separately by left and right eyes and allows a viewer to recognize a three-dimensional image) is viewed by each eye. Furthermore, since each slit moves left and right at a moderate speed, each eye sequentially receives a plurality of segmented images forming an entire image. As a result, the afterimage effect helps the eyes in receiving a practical result of an entire image. Accordingly, the left and right eyes of the viewer separately receive two types of images at different angles. Thus, the viewer can recognize a three-dimensional image.

The above described explanation can be alternatively given by referring to the attached figures as follows. In FIG. 5, encircled different portions of the three-dimensional object M are observed through two slits $1b_1$ and $1b_2$. (The ray paths are represented by solid lines.) To view two types of images as being viewed at different angles with left and right eyes separately is to receive a ray from a corresponding point of each of the two types of images with left and right eyes at different angles. As shown in FIG. 5, rays are received from different points of the three-dimensional image M. However, FIG. 5 shows no rays from the same point reaching left and right eyes at different incident angles. Now, observe one point (the tail of the arrow in FIG. 5) of the three-dimensional image M. A ray reaches left eye $S_L$ through slit $1b_1$. Assume that the slits ($1b$, $1b$, $1b$, ...) are moved in the direction indicated by arrow X. If slit $1b_1$ is positioned at the intersection of the dotted line connecting the right eye to the three dimensional image M and the plane where the slits ($1b$, $1b$, $1b$, ...) are arranged, then the ray from the tail of the three-dimensional image M reaches right eye $S_R$ through moved slit $1b_1$. At this time, the incident angle of the ray reaching the right eye is different from that of the ray reaching the left eye $S_L$. Actually, an image m displayed on the image display screen $3a$ emits rays to the left and right eyes, and the image m is displayed according to the movement of slit $1b_1$. When slit $1b_1$ is positioned such that the tail of the three-dimensional image is observed by left eye $S_L$, the image m displayed corresponding to the position of slit $1b_1$ shows to the right eye the tail portion of the three-dimensional image. Likewise, if slit $1b_1$ moves to show right eye $S_R$ the tail portion of the three-dimensional image M, then the tail portion of the image m displayed corresponding to the position of moved slit $1b_1$ is shown to right eye $S_R$. Thus, the same point of an image is shown to right and left eyes at different incident angles. If a ray reaches the left eye with slit $1b_1$ moved at a higher speed such that the ray can reach the right eye while it still remains in the left eye as an afterimage effect, then the viewer recognizes the ray as if it simultaneously reached from the tail of the three-dimensional image.

Next, described below are methods 1 and 2 of generating the image m to be displayed on the image display screen $3a$ so that the above described three-dimensional image M can be observed.

Figure 7:
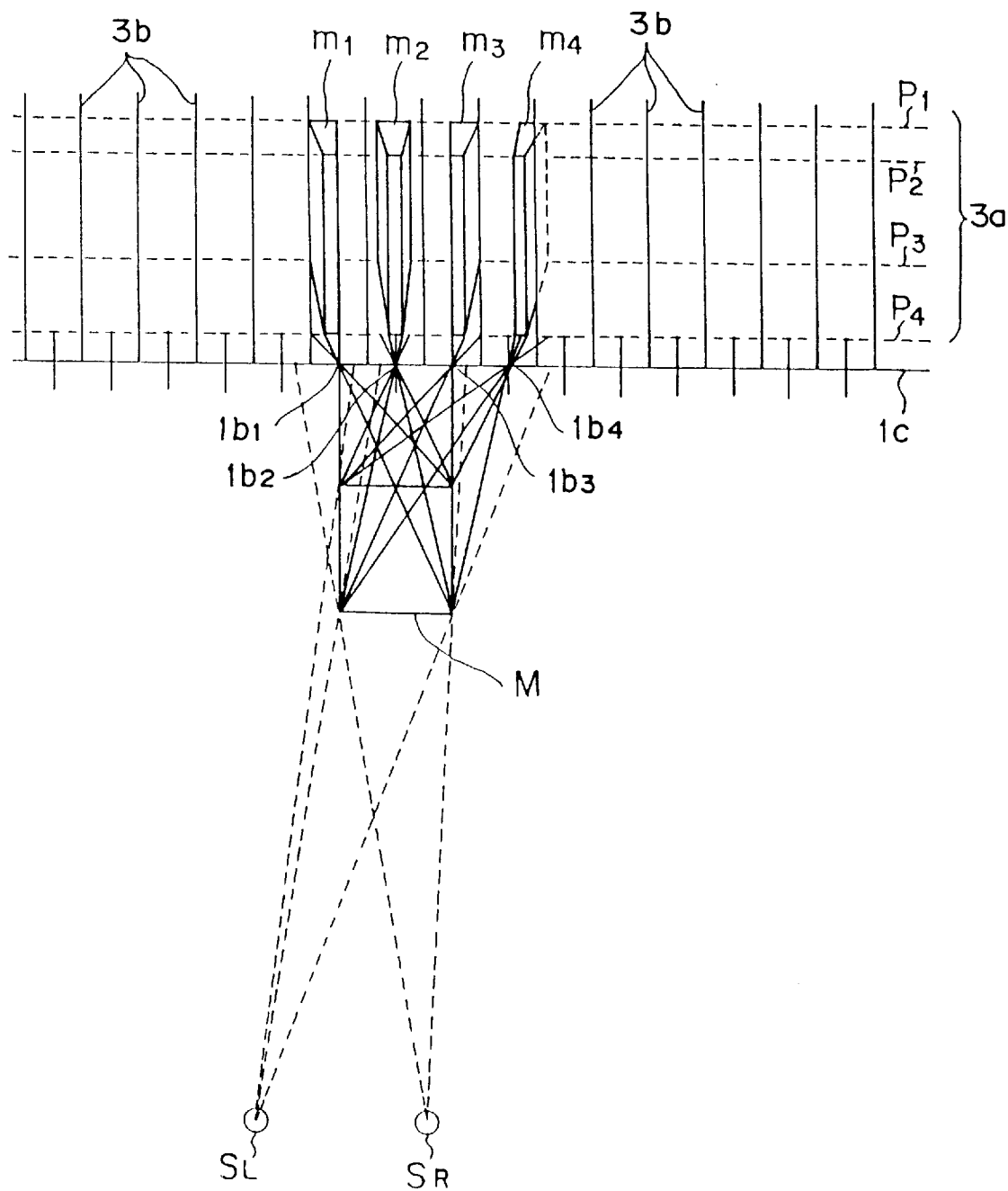
FIG. 7 is the top view partially represented as a front view and shows the principle of generating an image to be displayed on the three-dimensional image display device of method 1.
Figure 8:
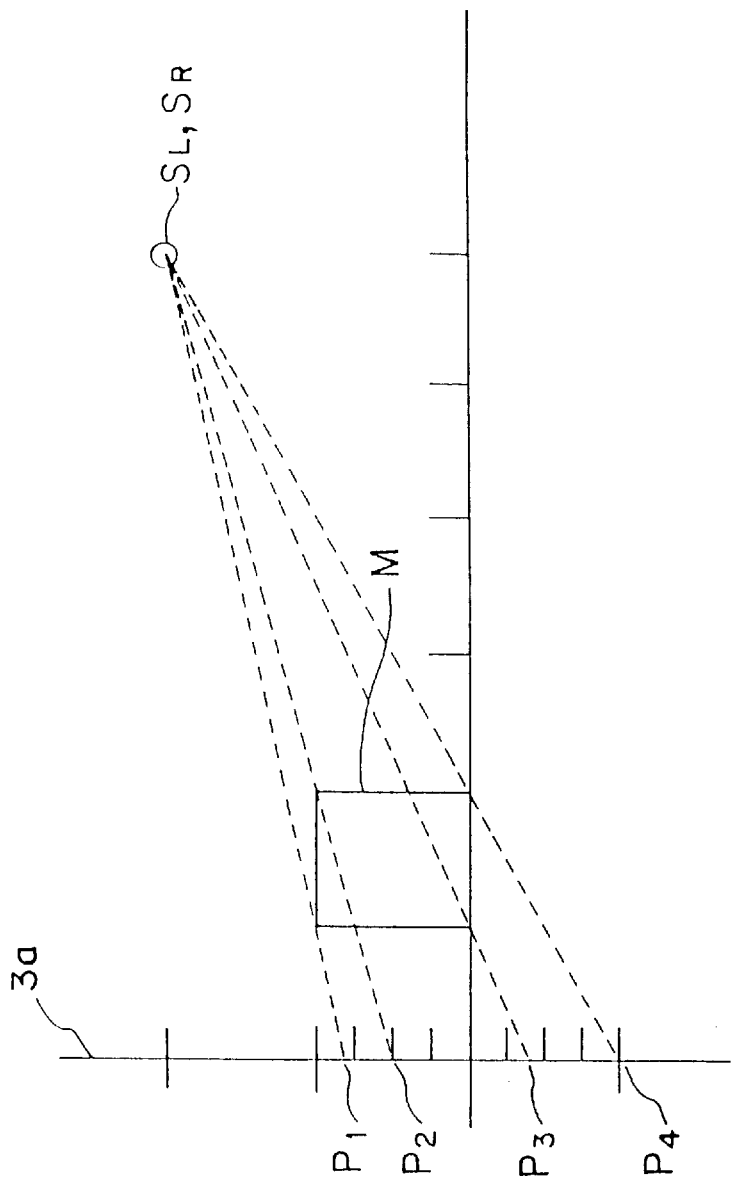
FIG. 8 is the side view corresponding to FIG. 7.

The first method of generating an image is explained below by referring to FIGS. 7 and 8. In this example, the image m is generated such that a cube is displayed as the three-dimensional image M in front of the arrangement (hereinafter referred to as a slit arrangement) $1c$ of a plurality of slits. FIG. 7 shows the left: and right eyes $S_L$ and $S_R$ of a viewer, a three-dimensional image M to be displayed (a cube in this example), the slit arrangement $1c$, and the image display screen $3a$ in this order. For easier explanation, the image m, which is normally shown in a top view, is shown as a front view as if the image display screen $3a$ were placed on its back. FIG. 8 is the side view corresponding to FIG. 7. As shown in FIG. 8, the point of the viewer's eyes $S_L$ and $S_R$ is a little higher than the point where the three-dimensional image M is placed. The three-dimensional image M is designed to appear in three dimensions before the image display screen $3a$. That is, it is set as a real image. FIG. 8 shows intersections $P_1$, $P_2$, $P_3$, and $P_4$ between the image display screen $3a$ and the four lines (indicated by broken lines) connecting the viewer's eyes $S_L$ and $S_R$ to the respective points of the cube to be displayed as the three-dimensional image M. These intersections correspond to positions $P_1$, $P_2$, $P_3$, and $P_4$ on the image display screen $3a$ shown in FIG. 7. The image m displayed on the image display $3a$ appears at the same position on the image display screen $3a$ from any point of the viewer's eyes $S_L$ and $S_R$ in height.

In FIG. 7, the broken lines connecting left and right eyes $S_L$ and $S_R$ to the points of the three-dimensional image M and reaching the slit arrangement $1c$ encompass the area in which the three-dimensional image M is displayed. Only the slits $1b_1$, $1b_2$, $1b_3$, and $1b_4$ in the encompassed area allow the viewer's eyes $S_L$ and $S_R$ to view an image on the image display screen $3a$. Accordingly, FIG. 7 only shows images $m_1$, $m_2$, $m_3$, and $m_4$ corresponding to slits $1b_1$, $1b_2$, $1b_3$, and $1b_4$. Likewise, images are generated corresponding to other slits and reach the eyes of another viewer at a different point of view.

Each of the images m displayed on the image display screen $3a$ can be practically generated as follows. First, the lines connecting the points of the three-dimensional image M to the slits $1b$ and further to the image display screen $3a$ indicate where the points of the image being observed by the viewer are displayed on the image display screen $3a$ through the slits $1b$. Thus, confirmed are the horizontal positions of the image m displayed on the image display screen $3a$ corresponding to the slits $1b$. The positions are incorporated into the vertical positions to generate images corresponding to the slits. Thus, the image is generated and a series of images corresponding to all slits are displayed on the image display screen $3a$. If the viewer is assigned limited points of view in viewing the display screen, then the images observed through the slits do not overlap to one another. That is, as shown in the image display screen $3a$ shown in FIG. 7, image display areas $3b$ are set in association with the slits. Any portion beyond the image display area $3b$, for example, the right side of image $m_4$ (indicated by broken lines) is not displayed on the display screen.

Figure 9:
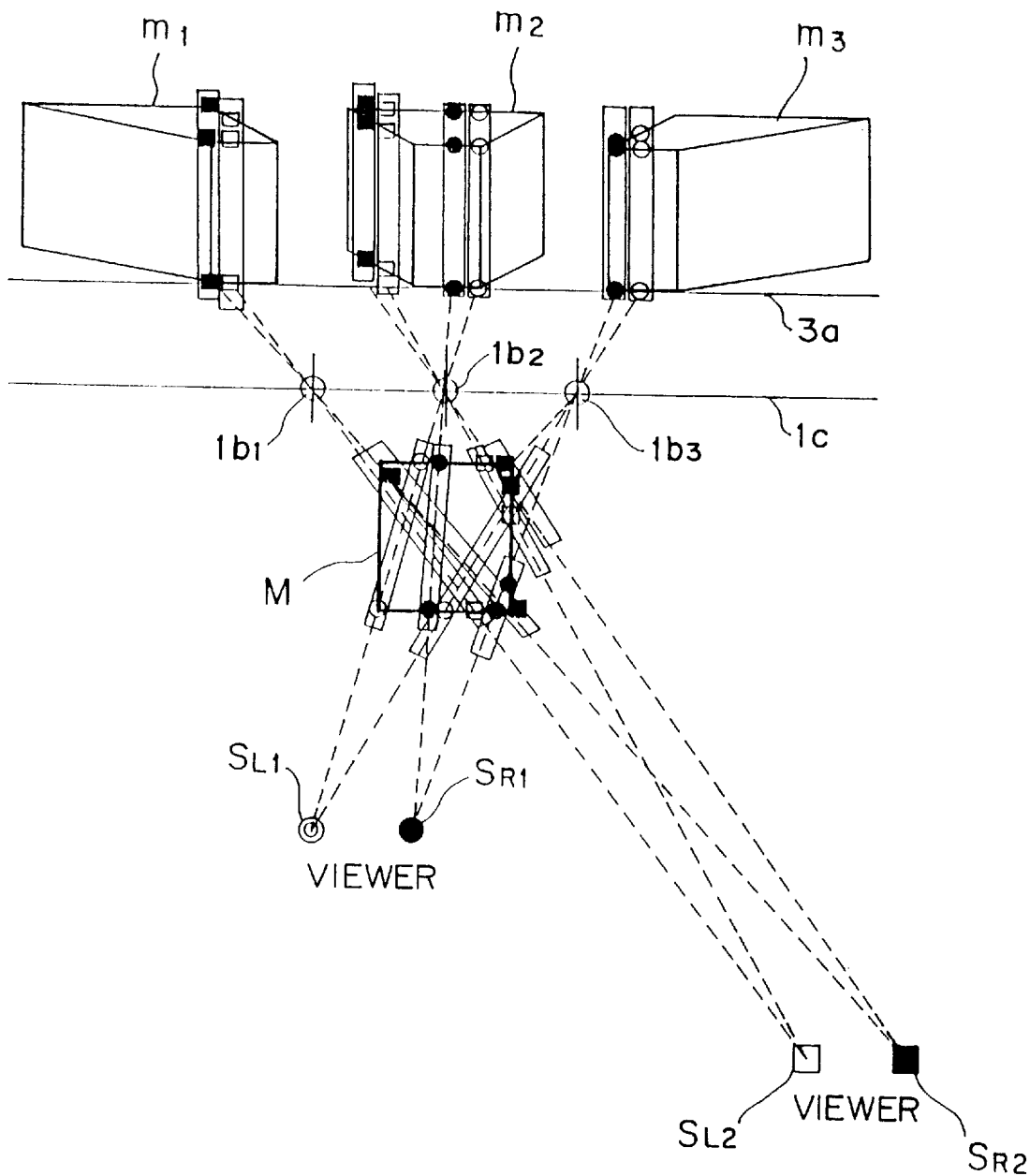
FIG. 9 is the top view partially represented as a front view and shows an example of an image to be displayed in three dimensions before the screen.
Figure 10:
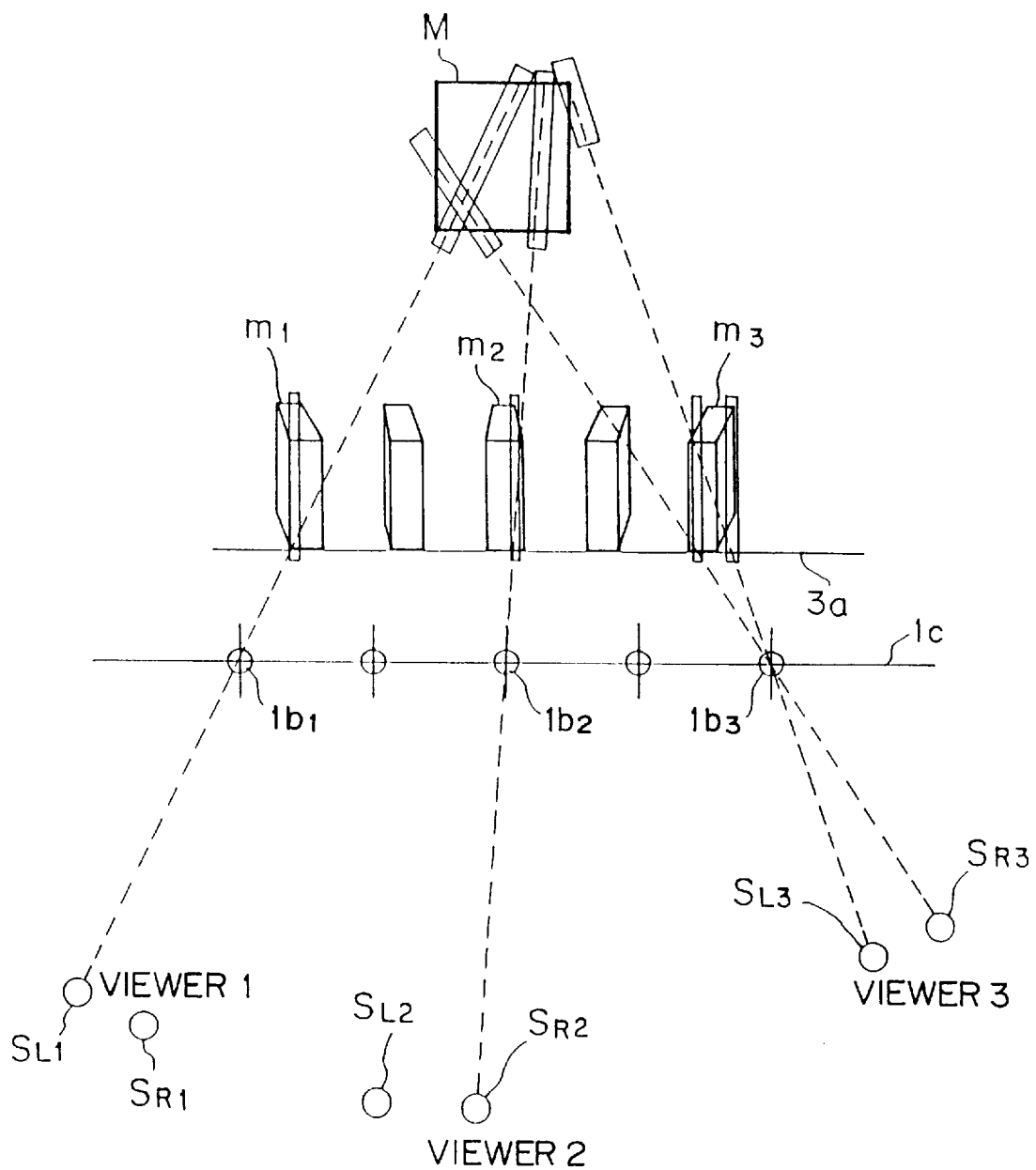
FIG. 10 is the top view partially represented as a front view and shows an example of an image to be displayed in three dimensions behind the screen.

FIGS. 9 and 10 as well as FIG. 7 show the image display screen $3a$ as being placed on its back and the three-dimensional image M as a cube. In FIG. 9, the entire image is displayed on the image display screen $3a$ corresponding to the slits without restrictions on display area for easy explanation.

If the three-dimensional image M is designed to appear in three dimensions before the display screen, the image is displayed as a narrower-front and broader-back image on the image display screen $3a$ as shown in FIG. 9. In FIG. 9, the left and right eyes $S_{L1}$, $S_{R1}$, $S_{L2}$, and $S_{R2}$ of two viewers capture from their points of view images $m_1$, $m_2$, and $m_3$ (points enclosed by strip-shaped rectangles) on the image display screen $3a$ through three corresponding slits $1b_1$, $1b_2$, and $1b_3$. That is, the rays emitted from the points indicated by respective marks of eyes (double circles, black-painted circle, white square, and black-painted square) reach eyes $S_{L1}$, $S_{R1}$, $S_{L2}$, and $S_{R2}$. Thus, the points of the three-dimensional image M enclosed by the rectangles are recognized by each eye as a part of the three-dimensional image M. That is, the marked points of images $m_1$, $m_2$, and $m_3$ are recognized by each eye as corresponding points of the three-dimensional image M which are indicated by the respective marks.

If the three-dimensional image M is designed to appear in three dimensions behind the display screen, the image is displayed as a broader-front and narrower-back image on the image display screen $3a$ as shown in FIG. 10. In FIG. 10, the left and right eyes $S_{L1}$, $S_{R1}$, $S_{L2}$, $S_{R2}$, $S_{L3}$, and $S_{R3}$ of three viewers capture from their points of view images $m_1$, $m_2$, and $m_3$ (points enclosed by strip-shaped rectangles) on the image display screen $3a$ through three corresponding slits $1b_1$, $1b_2$, and $1b_3$. At this moment, the rays from only images $m_1$ and $m_2$ reach each of $S_{L1}$ and $S_{R2}$ of viewers 1 and 2 through each of slit $1b_1$ and $1b_2$ respectively. The rays from image $m_3$ reach each of the left and right eyes $S_{L3}$ and $S_{R3}$ of viewer 3 through slit $1b_3$. Thus, the right viewer sees the two points of the three-dimensional image M. The rays from different points of the image m are displayed on the image display screen $3a$ and reach the left and right eyes of each viewer through corresponding slits. The images m on the image display screen change in accordance with a change in position of the slit $1b$, and the rays from the images in different positions reach the eyes of viewers through the position-changing slits. Therefore, each viewer recognizes the various points of the three-dimensional image M, thereby entirely recognizing the three-dimensional image M.

Figure 11:
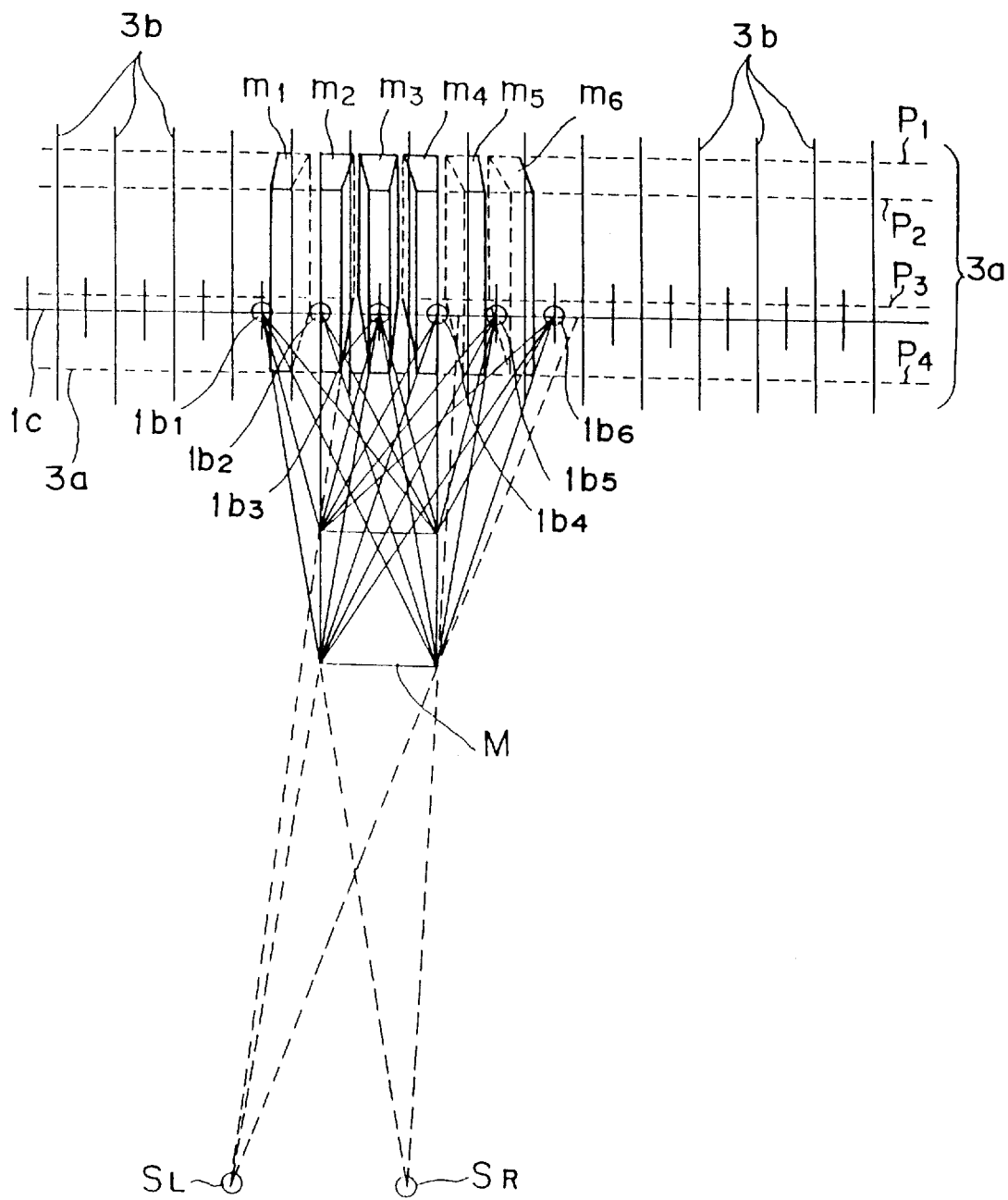
FIG. 11 is the top view partially represented as a front view and shows the principle of generating an image to be displayed on the three-dimensional image display device of method 2.
Figure 12:
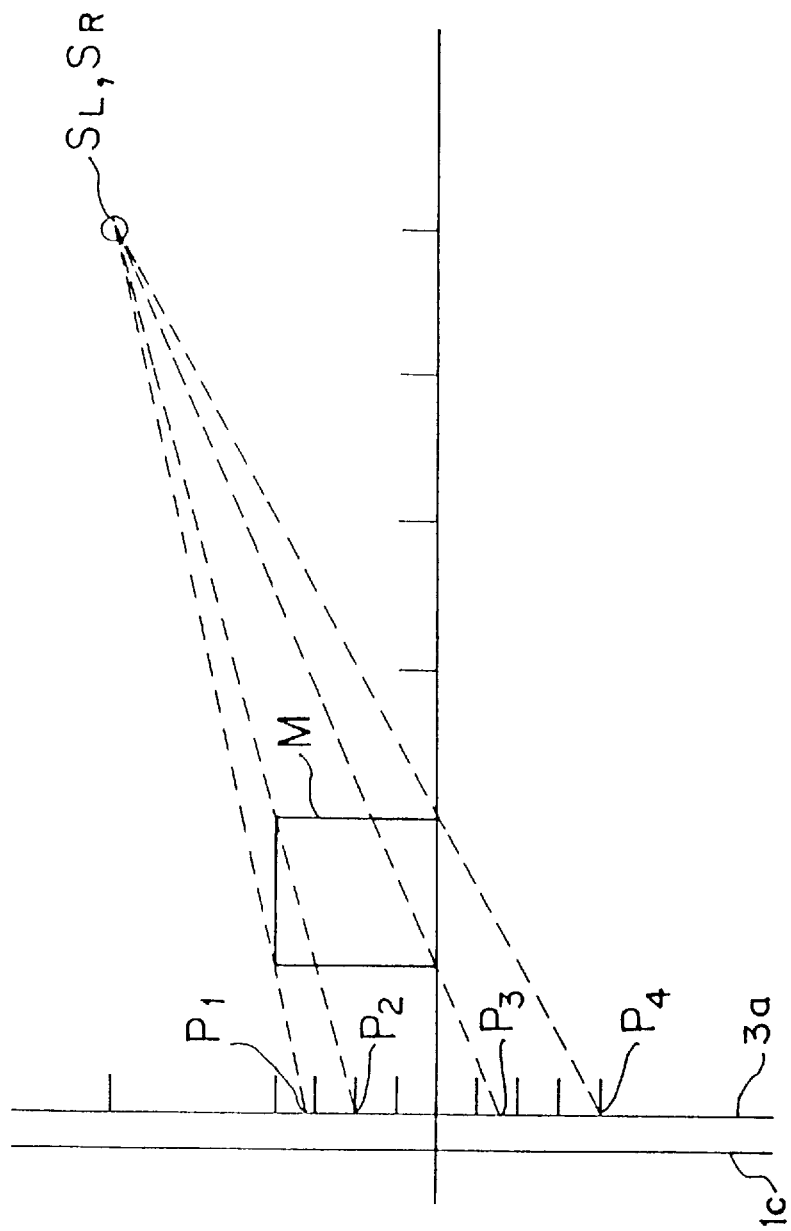
FIG. 12 is the side view corresponding to FIG. 11.

Then, the second method of generating an image is described in detail below by referring to FIGS. 11 and 12. For example, the image m is generated such that the three-dimensional image M is displayed in three dimensions before the image display screen 3a. FIG. 11 shows the left and right eyes $S_L$ and $S_R$ of a viewer, the three-dimensional image (a cube in this example) M, a pass-through image display screen 3a, and the slit arrangement 1c in this order. The rays uniformly reach the pass-through image display screen 3a through slits 1b from a light source which is not shown in FIG. 11, but provided behind the slit arrangement 1c. Although the image m is normally shown in a top view, it is shown in a front view with the image display screen 3a placed on its back in FIG. 11. FIG. 12 is a side view corresponding to FIG. 11. As shown in FIG. 12, the point of the eyes $S_L$ and $S_R$ of the viewer is a little higher than the point where the three-dimensional image M is placed. The three-dimensional image M is designed to appear in three dimensions before the image display screen 3a. That is, it is set as a real image. FIG. 12 shows intersections $P_1$, $P_2$, $P_3$, and $P_4$ between the image display screen 3a and the four lines (indicated by broken lines) connecting the viewer's eyes $S_L$ and $S_R$ to the respective points of the cube to be displayed as the three-dimensional image M. These intersections correspond to positions $P_1$, $P_2$, $P_3$, and $P_4$ on the image display screen 3a shown in FIG. 11. The image m displayed on the image display 3a appears at the same position on the image display screen 3a from any point of the viewer's eyes $S_L$ and $S_R$ in height.

In FIG. 11, the broken lines connecting left and right eyes $S_L$ and $S_R$ to the points of the three-dimensional image M and the image display screen 3a and reaching the slit arrangement 1c encompass the area in which the three-dimensional image M is displayed. The slits $1b_1$, $1b_2$, $1b_3$, $1b_4$, $1b_5$, and $1b_6$ in the encompassed area allow the rays to reach the viewer's eyes $S_L$ and $S_R$ through the image on the image display screen 3a. Accordingly, FIG. 11 only shows images $m_1$, $m_2$, $m_3$, $m_4$, $m_5$, and $m_6$ corresponding to slits $1b_1$, $1b_2$, $1b_3$, $1b_4$, $1b_5$, and $1b_6$. Likewise images are generated corresponding to other slits and reach the eyes of another viewer at a different point of view.

Each of the images m displayed on the image display screen 3a can be practically generated as follows. First, the intersections between the image display screen 3a and the lines connecting the points of the three-dimensional image M to the slits 1b indicate where on the image display screen 3a the rays passing through the slits make the viewer observe the points of the image being observed. Thus, confirmed are the horizontal positions of the image m displayed on the image display screen 3a corresponding to the slits 1b. The vertical positions of the image m can be obtained by extending the lines connecting the assumed eyes $S_L$ and $S_R$ to respective points of the three-dimensional image M to the image display screen 3a as shown in FIG. 12. Thus, the entire image can be generated corresponding to the slits. If the viewer is assigned limited points of view in viewing the display screen, then the images observed through the slits do not overlap one another. That is, as shown in the image display screen 3a shown in FIG. 11, image display areas 3b are set in association with the slits. Any portion beyond the image display area 3b, for example, the right side of image $m_1$ or the left sided of images $m_5$ and $m_6$ (indicated by broken lines) are not displayed on the display screen.

Described below is the generation of an image by the three-dimensional image recording device according to the present invention.

Figure 13:
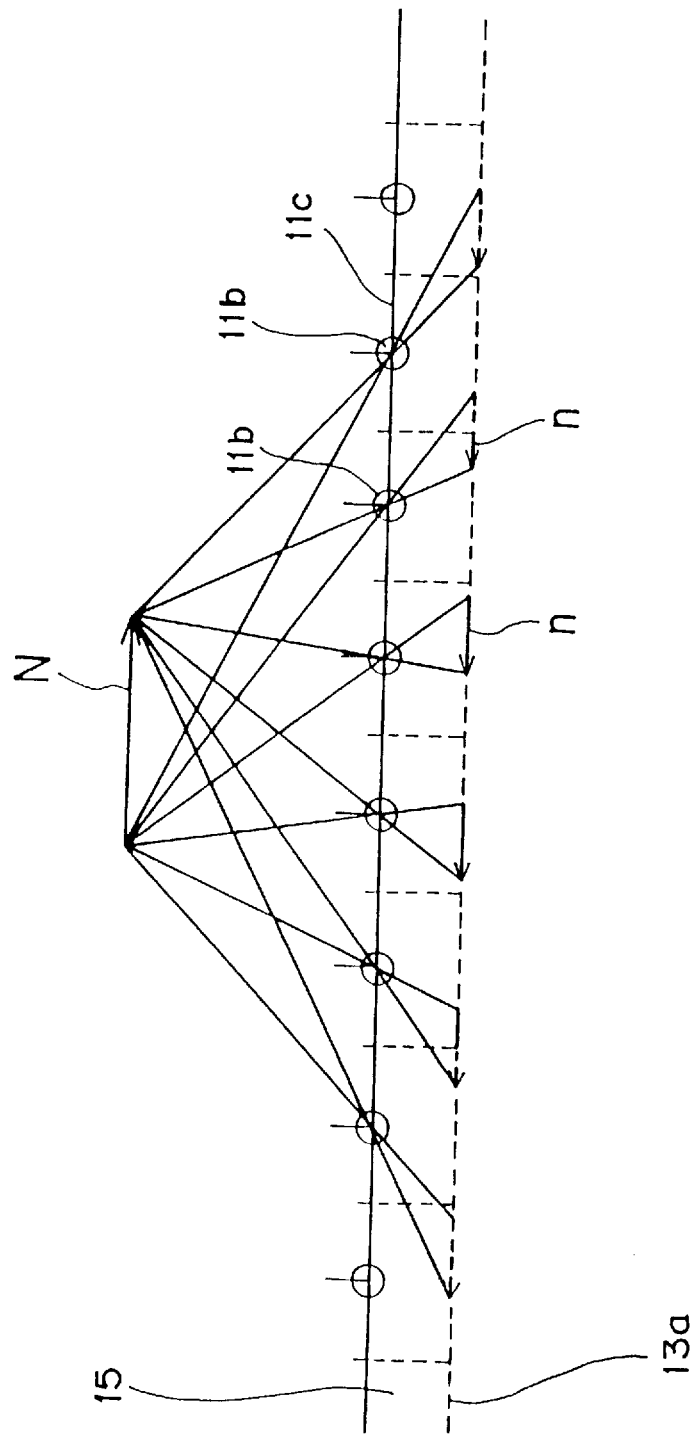
FIG. 13 shows the principle of generating an image by the three-dimensional image recording device.

When a natural object is recorded as a three-dimensional image, the direction and intensity of the rays from the object is needed to be recorded. The horizontal positions of the points of the object are recorded by protecting on an image recording screen the rays which pass through slits based on the principle of a pin-hole camera. For example, a three-dimensional object N (a right-directing arrow in this example) to be recorded is positioned before the arrangement (11c) of a plurality of slits (11b, 11b, . . . ) as shown in FIG. 13. The rays from the three-dimensional object are projected on the image recording screen 13a through the slits (11b, 11b, . . . ), and an image n of a left-directing arrow is recorded on the image recording screen 13a.

Figure 14:
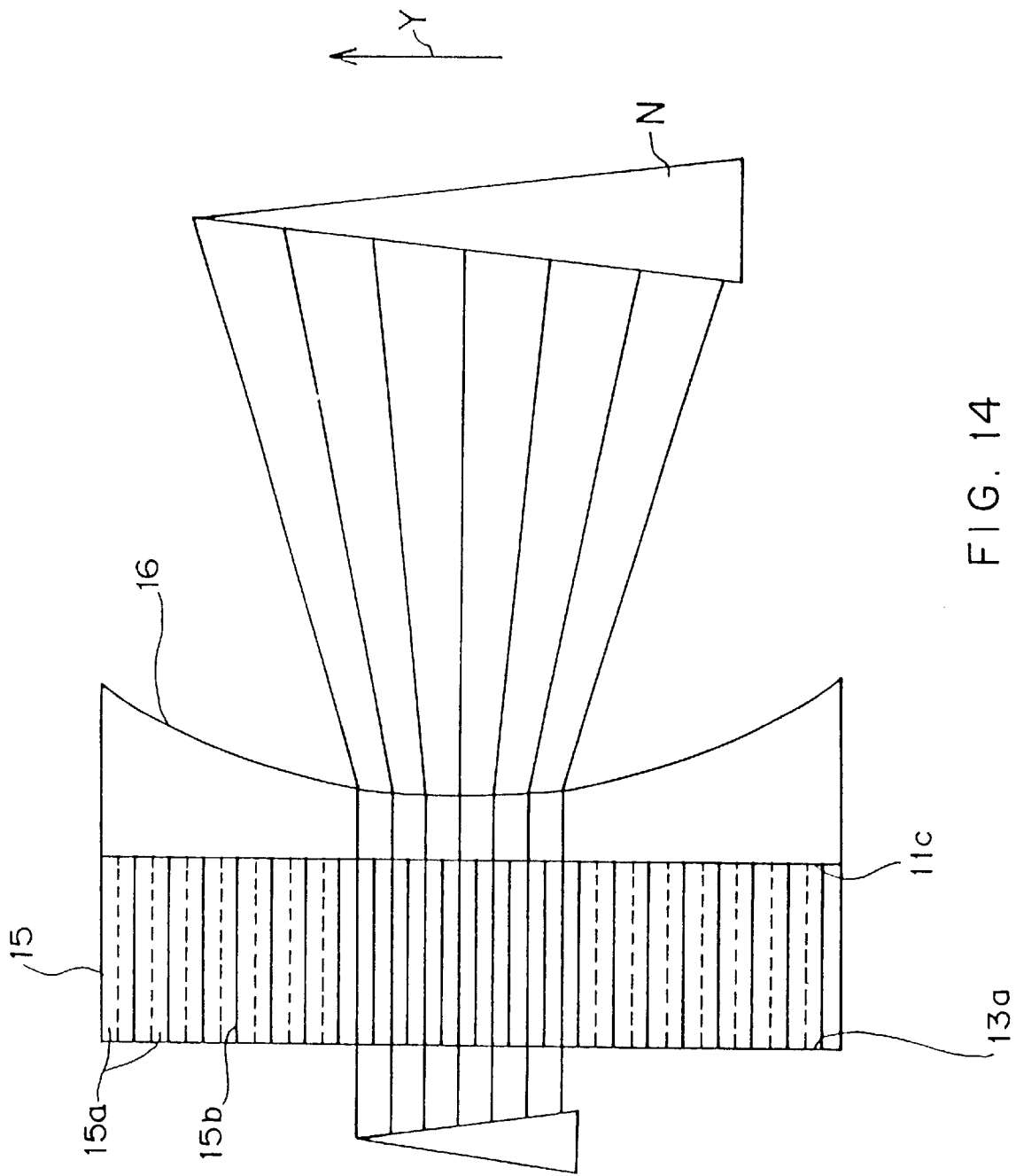
FIG. 14 shows the vertical path of the rays in the three-dimensional image recording device.

The recording scope in the vertical direction can be set by, for example, an optical lens by obtaining the diverging angle. The size of an image can be set in proportion to the angle. For example, the object is segmented horizontally in accordance with the resolution of a screen. Each piece is assigned its vertical position. Practically, a lens 16 (a concave lens) is positioned before the arrangement of the slits 11 as shown in the side view in FIG. 14. The rays from the points of the three-dimensional object N are recorded on the image recording screen 13a along the ray path in the perpendicular direction (indicated by arrow Y) of the three-dimensional object N (a square cone in this example). That is, the rays from the vertical points of the three-dimensional object N are limited by the lens 16 and pass through the slits 11b. Then, the ray path is limited by the boundaries (horizontal surfaces) of the ray path restricting unit 15, and the light reaches the image recording screen 13a. Vertically long slits allow light rays of various directions and various angles coexist in the vertical plane. However, the ray path restricting unit is provided because a ray should be uniquely selected for each position on the image recording screen 13a.

Figure 15:
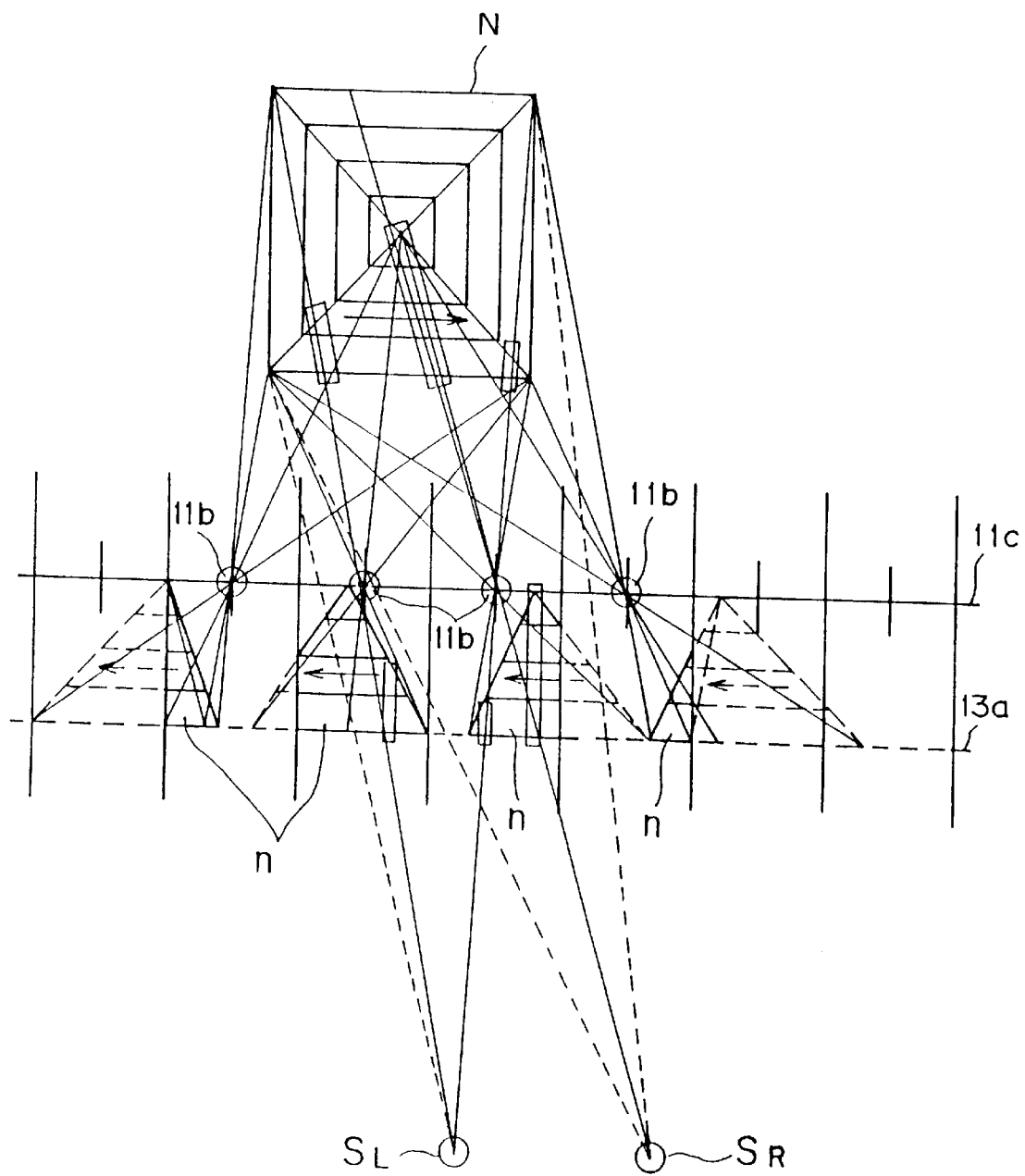
FIG. 15 is the top view partially represented as a front view and shows the horizontal path of the rays in the three-dimensional image recording device.

On the other hand, in the horizontal plane, the rays from the segmented three-dimensional object N extend in a form of a fan as shown in FIG. 15 after passing through the slits 11b. The extended rays are projected on the image recording screen 13a, and the image n is recorded corresponding to the slits. When the image is regenerated by the three-dimensional image display device of method 2, the eyes $S_L$ and $S_R$ of a viewer capture the three-dimensional image of the three-dimensional object N based on the same principle as shown in FIG. 11.

As described above, the three-dimensional image display device and the three-dimensional image recording device are provided with the variable multi-slit screen shutter. In the display device, an image is displayed on the image display screen 3a positioned at a specified distance from the screen shutter. In the image recording device, the rays are projected on the image recording screen 13a positioned at a specified distance from the screen shutter. With the interlocking scanning of the slits by the variable multi-slit screen shutter, a number of small images are displayed on the image display screen 3a corresponding to respective slits or a number of small images are projected on the image recording screen corresponding to respective slits and recorded. Thus, a series of three-dimensional images are displayed or recorded. At the sacrifice of three-dimensionality in vertical direction, the high brightness at the display screen or the recording screen is achieved. To attain this, the height of a view point is determined for generating an image in the display device, or the ray path restricting unit 15 is provided between the screen shutter and the image recording screen in the image recording device. That is, regardless of method 1 or 2, the display device and the image recording device are based on the same operating principle. They differ only in the positions of common components and the directions of rays. The operation of the present invention is summarized as follows by referring to the entire operation of the display device according to method 1.

The multi-slit screen shutter allows a viewer to see an entire image strip from top to bottom corresponding to each slit so as to cover the vertical direction. Relating to the horizontal direction, the viewer sees vertically long and narrow strips of different parts of images on the display screen according to the viewer's position. It is obvious that the right and left eyes capture different image points. On the other hand, the rays (the cross section indicates a strip of luminous flux) reaching the eyes through the slits refer to the rays emitted from a specific point of a three-dimensional image to be displayed, and depend on the position of eyes, slits, and the three-dimensional image, thereby partially regenerating the direction of the rays emitted from a three-dimensional object. Since a single luminous flux cannot permit a viewer to recognize an image as a three-dimensional image, plural lines of rays should simultaneously reach viewer's eyes to allow the viewer to recognize a series of the image in three dimensions.

A large number of slits should be arranged in parallel to allow the largest possible number of images to reach viewer's eyes. Since each of the images corresponding to respective slits is displayed in three dimensions, the adjacent images corresponding to the respective adjacent slits must not overlap each other. Relating to the display device, it is desirable that a viewer is not assigned limited points of view. However, a plurality of viewers can observe an image or a single viewer can observe an image from a side view point if a certain diverging angle is obtained. Therefore, restricting the diverging angle prevents overlap between images, thereby minimizing the distance between slits. However, if the distance is too small, the size of an image corresponding to each slit is small, thereby reducing the resolution. Therefore, images should be well balanced between image size and slit intervals, that is, the number of slits, to ensure the resolution of images.

The multi-slit (a plurality of slits) allows a plurality of points of an image to be simultaneously observed through a plurality of luminous fluxes. However, the multi-slit should be moved bit by bit at very short time intervals and simultaneously displays images corresponding to respective slits so as to obtain a series of minute images. It is obvious that the contents and the position of the image depends on an image to be displayed or the positions of slits. Thus, three-dimensional moving images and dynamic images can be displayed as three-dimensional TV.

Figure 16:
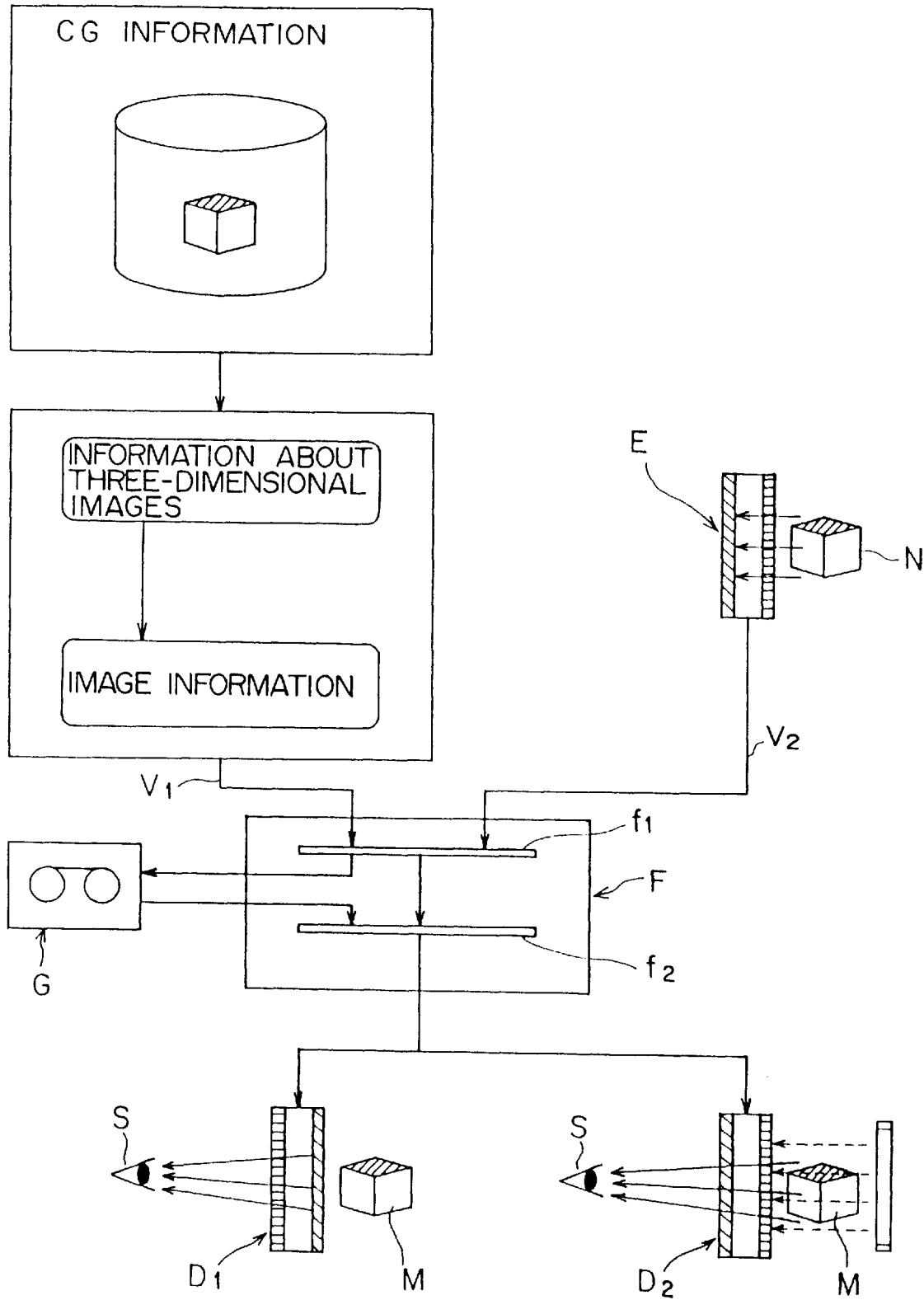
FIG. 16 shows the outline of the configuration indicating an example of the three-dimensional image recording and regenerating system according to the first embodiment of the present invention.

FIG. 16 shows the outline of the configuration showing an example of the three-dimensional image recording and regenerating system structured with an embodiment of the present invention. The system includes two methods (methods 1 and 2) of three-dimensional image display device $D_1$ and $D_2$, and a three-dimensional image recording device E.

In FIG. 16, CG (computer graphics) information is the information about three-dimensional images. Using the CG information, a three-dimensional image can be displayed on the display device $D_1$ and $D_2$. In this case, the combination of the information about three-dimensional images and about the height of the viewer's eyes is required in generating an image corresponding to the positions of respective slits by the ray tracing method. Putting thus generated images together generates a plurality of images of one screen. Then, a plurality of screens of images are generated in relation to the movement of the positions of the slits. Cyclically repeating the above described processes generates a video signal $V_1$ indicating three-dimensional images serialized in time. The video signal is switched by signal switching unit $f_1$ and $f_2$ of a system control device F, and recorded by a video recording device G or directly transmitted to display device $D_1$ and $D_2$. Thus the three-dimensional image M can be observed by a viewer.

On the other hand, video signal $V_2$ is generated by capturing the three-dimensional object N by an image recording device E. It has the same format as video signal $V_1$ generated by the above described CG information, switched by signal switching units $f_1$ and $f_2$ of the system control device F, and provided for the video recording device G or display device $D_1$ and $D_2$ as in the case of video signal $V_1$. From the view point of the viewer's eye S, the picture of the cube shown behind display devices $D_1$ and $D_2$ indicates that the three-dimensional image M appears at this position.

Figure 17:
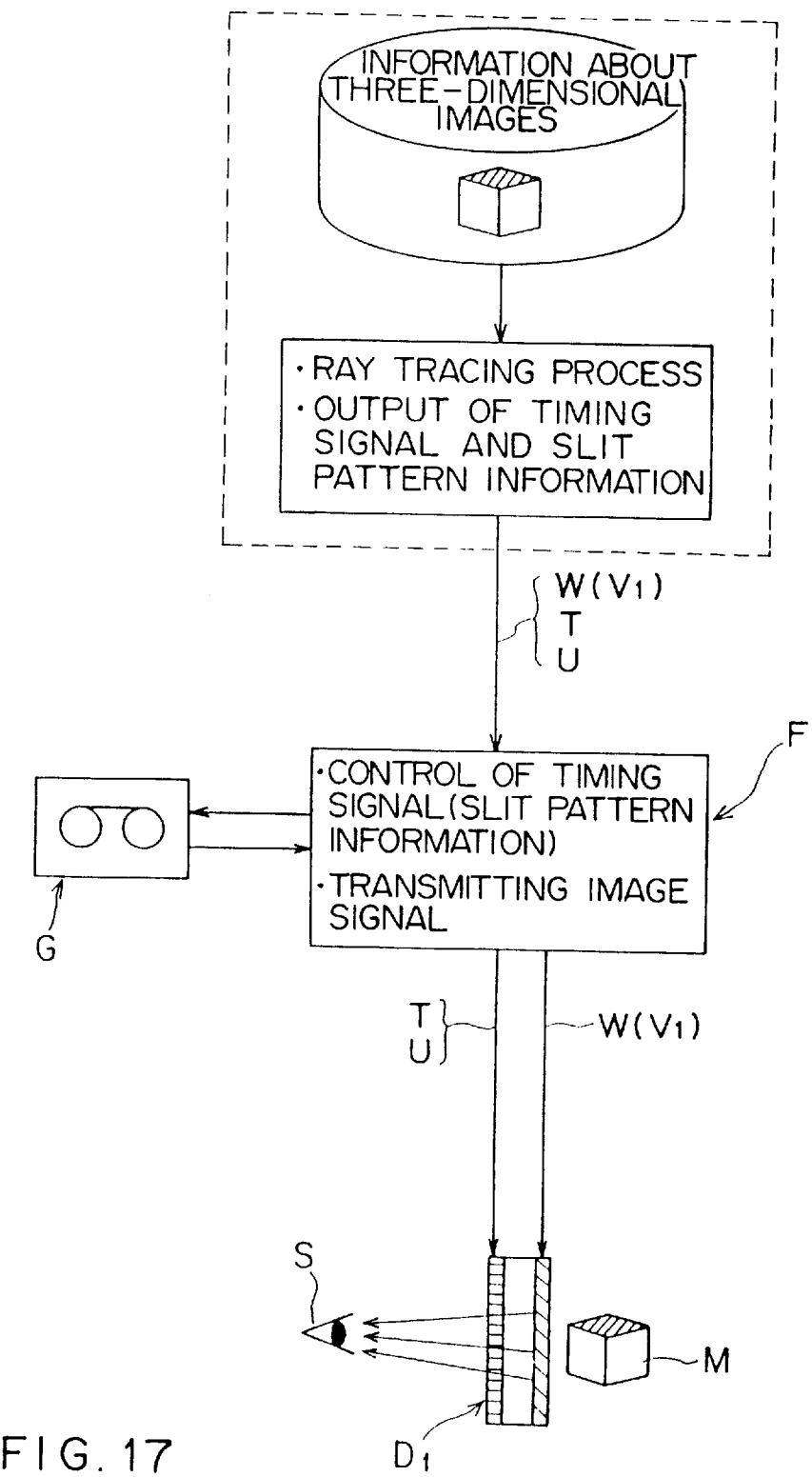
FIG. 17 shows the configuration of the system when images are displayed on the display device $D_1$ of method 1 in FIG. 16.
Figure 18:
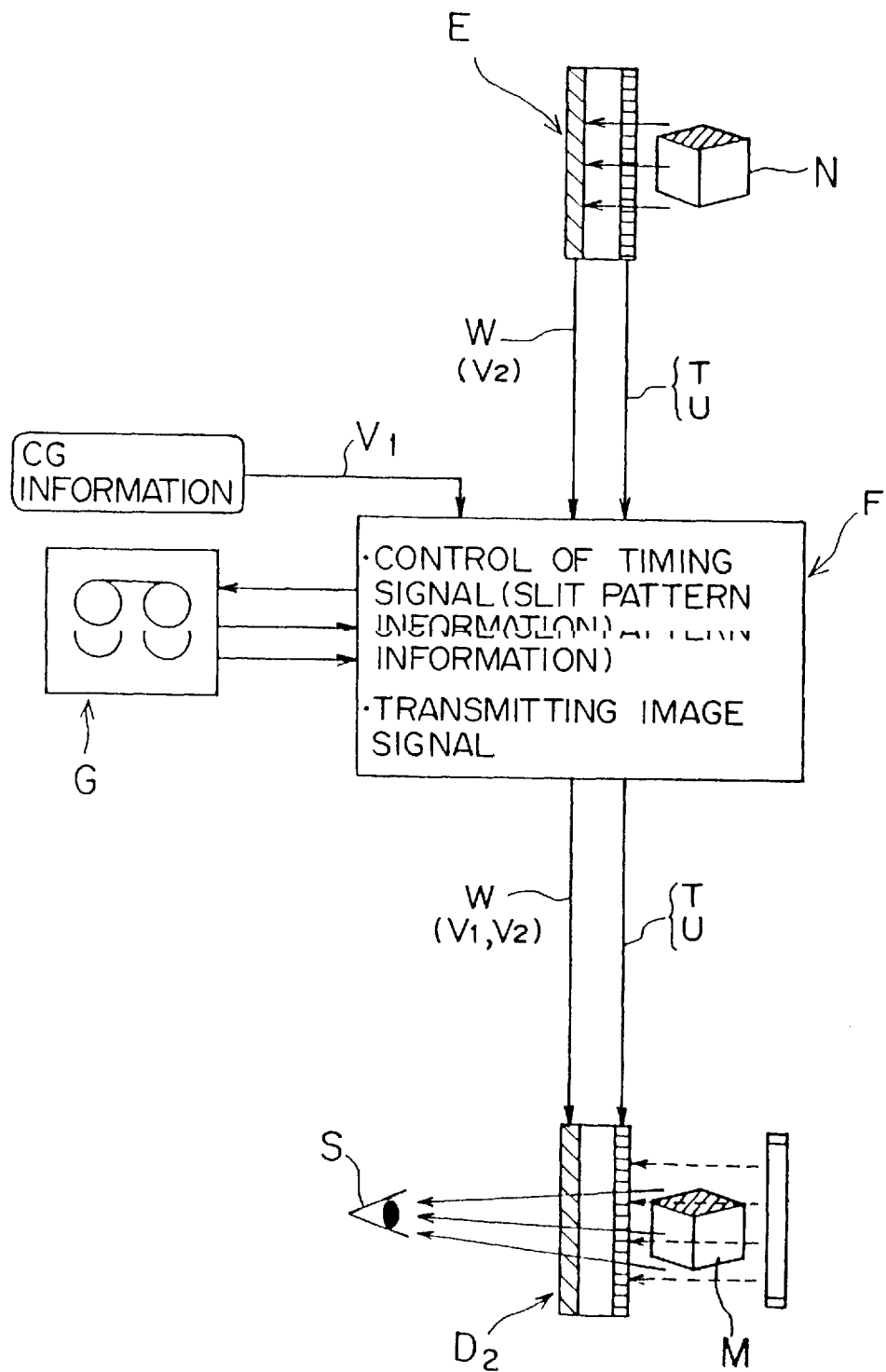
FIG. 18 shows the configuration of the system when images are displayed on the display device $D_2$ of method 2 in FIG. 16.

FIGS. 17 and 18 shows the configurations of the systems designed to display images on display device $D_1$ by method 1 and display device $D_2$ by method 2 respectively.

Figure 19:
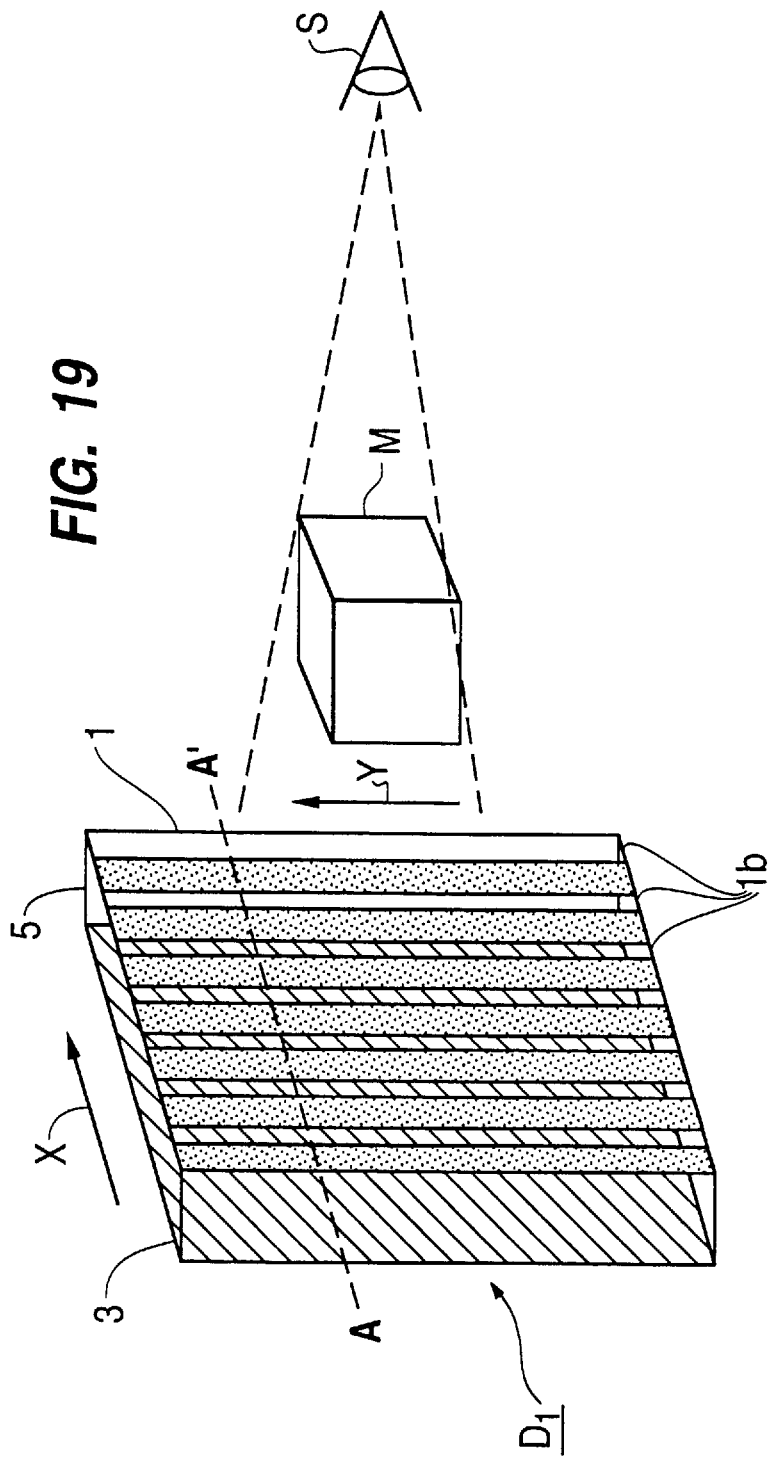
FIG. 19 shows an example of the practical configuration of the display device $D_1$ of method 1.
Figure 20:
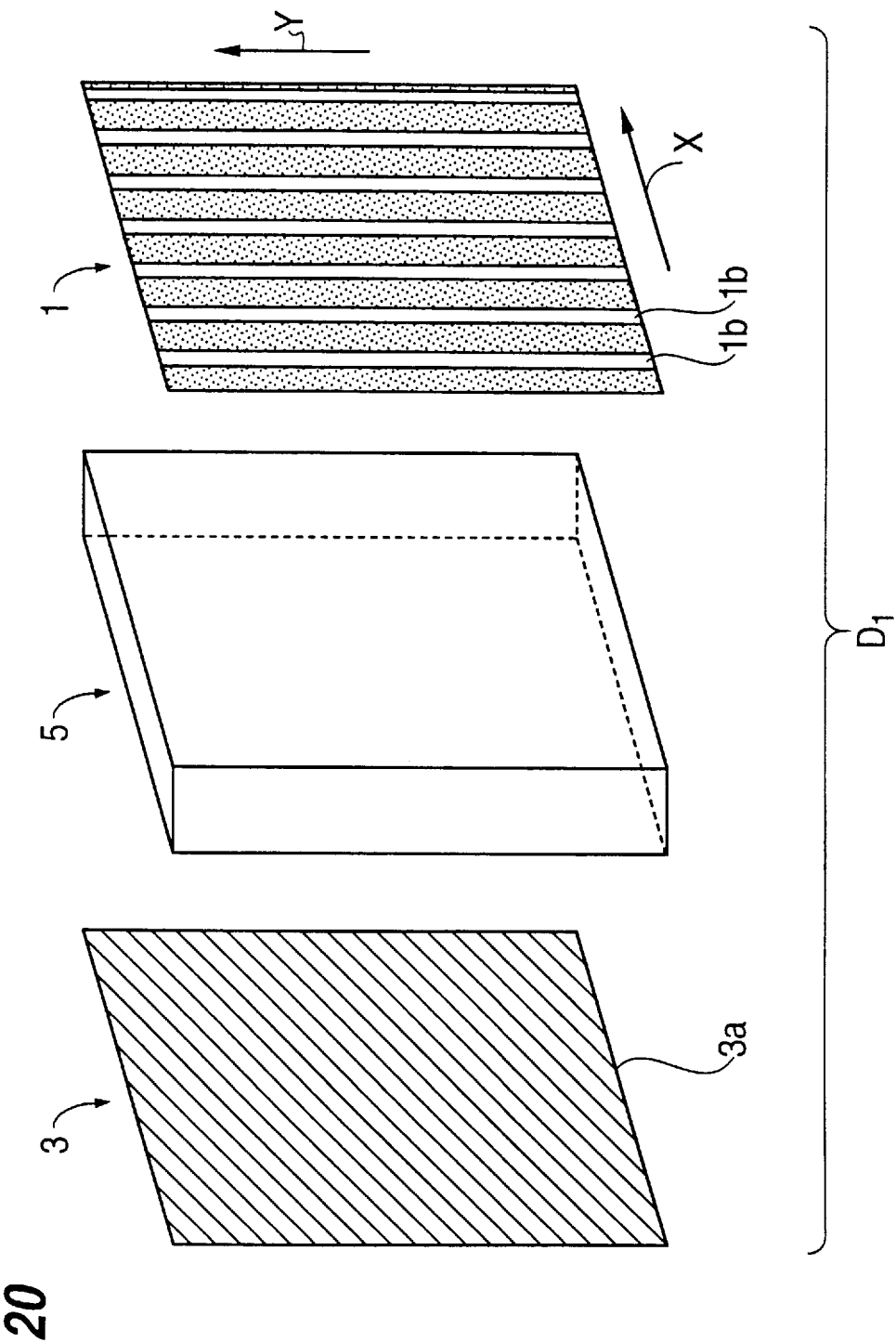
FIG. 20 shows the analytic configuration of the display device $D_1$ shown in FIG. 19.

As practically shown in FIGS. 19 and 20, display device $D_1$ of method 1 shown in FIG. 17 comprises the screen shutter units 1, each being a liquid crystal shutter, provided before (on the side of a viewer) the display unit 3 comprising a liquid crystal display device, a plasma display device, etc. with a spacer 5 of a transparent material (glass for example) of a given thickness. These components are put in one unit.

Figure 21:
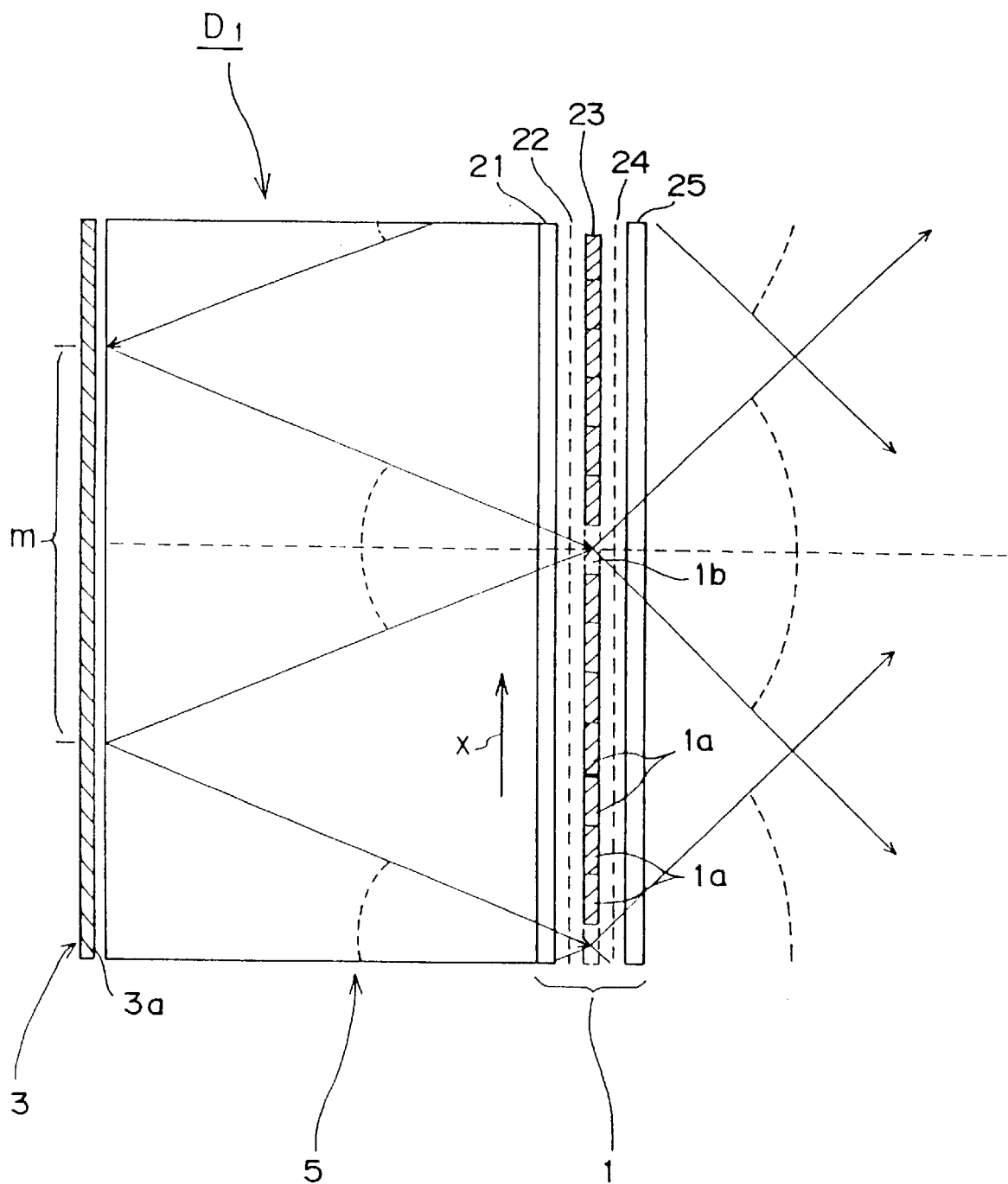
FIG. 21 is the cross-sectional view of a part of the display device $D_1$ of method 1 along the line A–A' in FIG. 19.
Figure 22A:
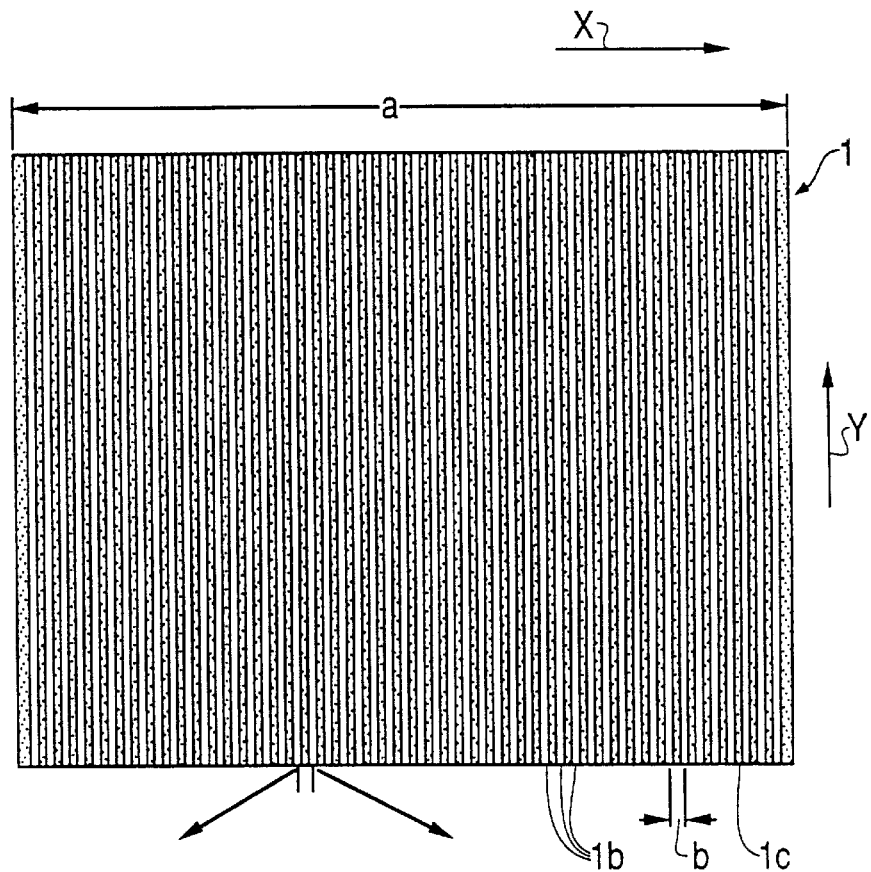
FIG. 22A shows an example of the configuration of the screen shutter unit 1 and is the front view of the slit arrangement of the screen shutter unit 1.
Figure 22B:
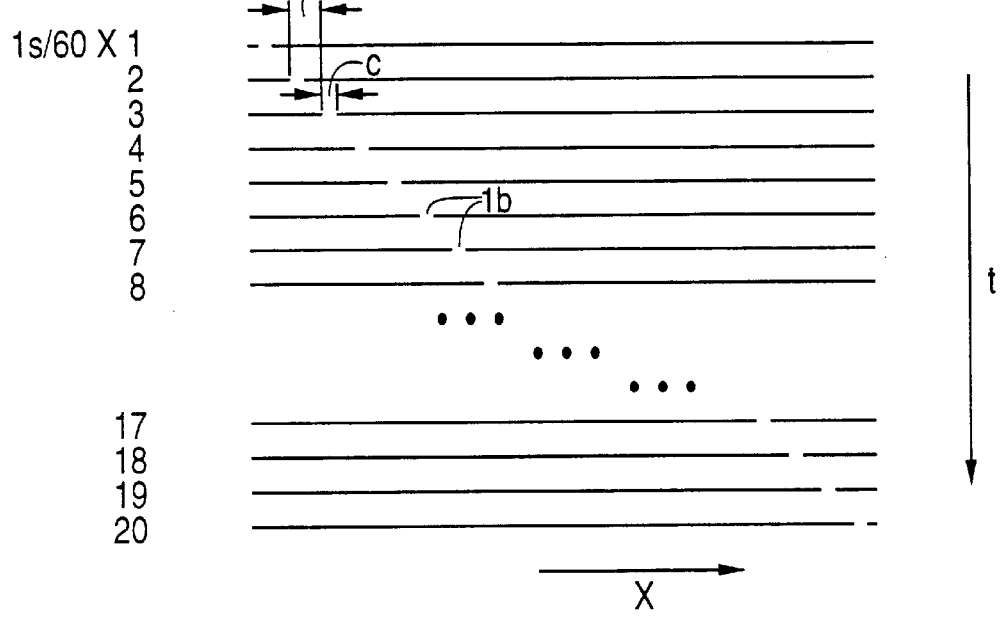
FIG. 22B shows the process of moving the slits 1b with the intervals b of the slits shown in FIG. 22A enlarged.
Figure 23:
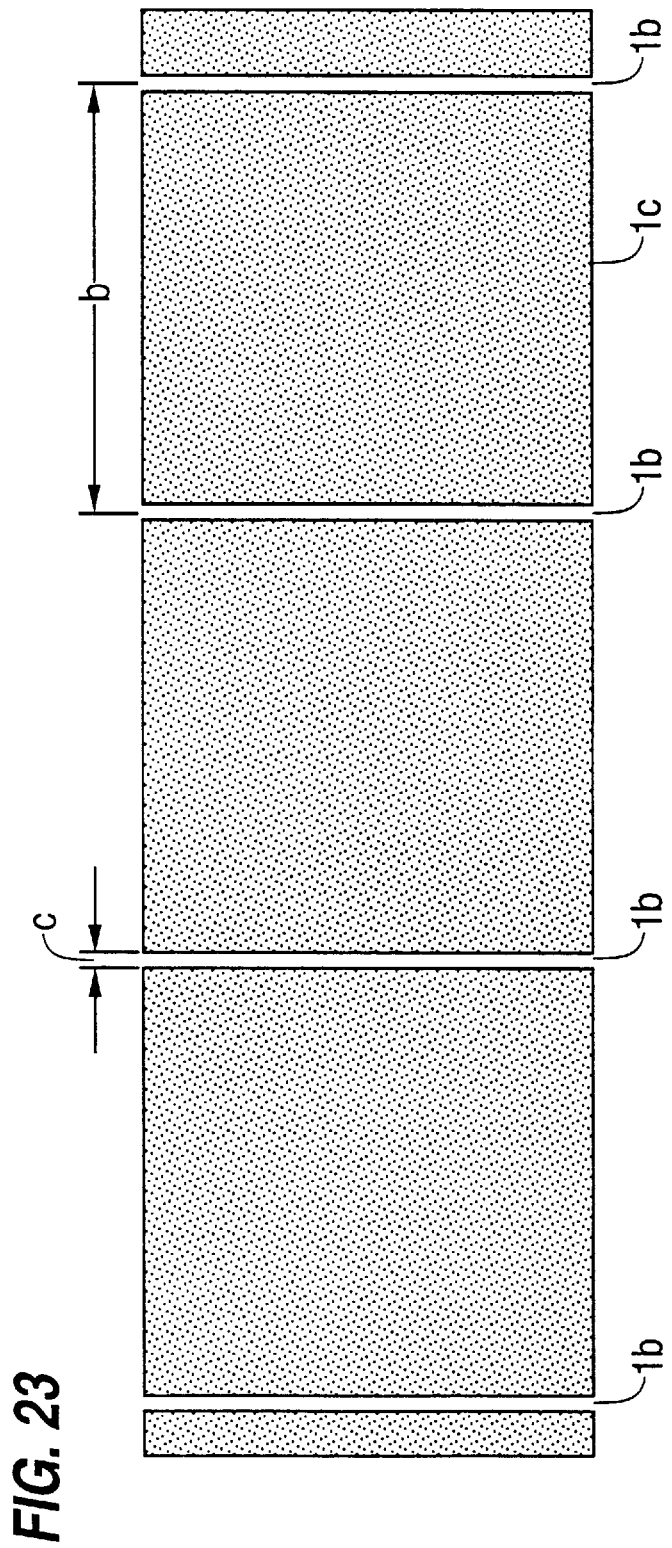
FIG. 23 is the enlarged front view of the slit arrangement 1c of the screen shutter unit 1.

In FIG. 21, the screen shutter unit 1 further comprises a polarizing plate 21, a transparent electrode 22, a liquid crystal plate 23, a transparent electrode 24, a polarizing plate 25, and a transparent glass plate (not shown in FIG. 21) to protect the outer surface of the polarizing plate 25, etc. They are sequentially arranged next to the spacer 5 as shown in FIG. 21 which is a cross-sectional view showing a part of display device $D_1$ as being segmented horizontally, that is, the direction along the line A–A' in FIG. 19. Assume that the screen shutter unit 1 is viewed from its front (from the right side in FIG. 21). A long and narrow shutter (liquid crystal shutter) 1a capable of passing through and intercepting rays comprises a plurality of shutters (1a, 1a, . . . ) arranged vertically in parallel (in the direction of arrow Y in FIGS. 19 and 20) at intervals horizontally (in the direction of arrow X in FIGS. 19, 20, and 21). That is, transparent electrodes 22 and 24 are segmented into small parts corresponding to respective shutters 1a, thereby passing and intercepting rays by controlling a voltage applied to the liquid crystal of each segment. Furthermore, the screen shutter 1 is operated by a shutter control unit not shown in FIG. 21 such that vertically long slits 1b, 1b, . . . are selected at specified intervals from the plurality of shutters (1a, 1a, . . . ) and function as ray passing slits (FIGS. 19 and 20), and that the position of the entire slits (1b, 1b, . . . ) is horizontally moved (in the direction of arrow X) at specified time intervals. FIG. 21 shows the configuration of the slits 1b in which one of the shutters (1a, 1a, . . . ) is transparent. The screen shutter unit 1 is designed such that, for example, the width a of the screen shutter unit is 50 cm and the distance b between adjacent slits 1b equals 1 cm as shown in FIG. 22A. FIG. 22B shows a result of moving one slit 1b with the drawing of the above mentioned distance b (=1 cm) enlarged. As shown in FIG. 22B, if the width c of one slit 1b (that is, the width of one shutter 1a) equals 0.25 mm, the slits (1b, 1b, . . . ) move horizontally (in the direction of arrow X) at a speed of the distance d=0.5 mm per 1/60 second as time t passes. The width c may be called as a slit divergence width or a slit opening width. The distance b=1 cm can be covered in $20/60$ second. Obviously the figures are shown as examples only. The slits (1b, 1b, . . . ) are moved horizontally by a basic distance (=d) sequentially, that is, an adjacent shutter 1a is sequentially switched to open as a slit 1b. The basic distance (=d) may be called as a slit movement width or interval. The slits are also moved horizontally by a multiple (k) of the basic distance (=d), that is, a product of kxd. That is, the k-th shutter from the adjacent shutter is switched to the open slit 1b. It is obvious that some other moving methods can be applied. FIG. 23 shows the enlargement of the slit arrangement 1c of the screen shutter unit 1.

Figure 24:
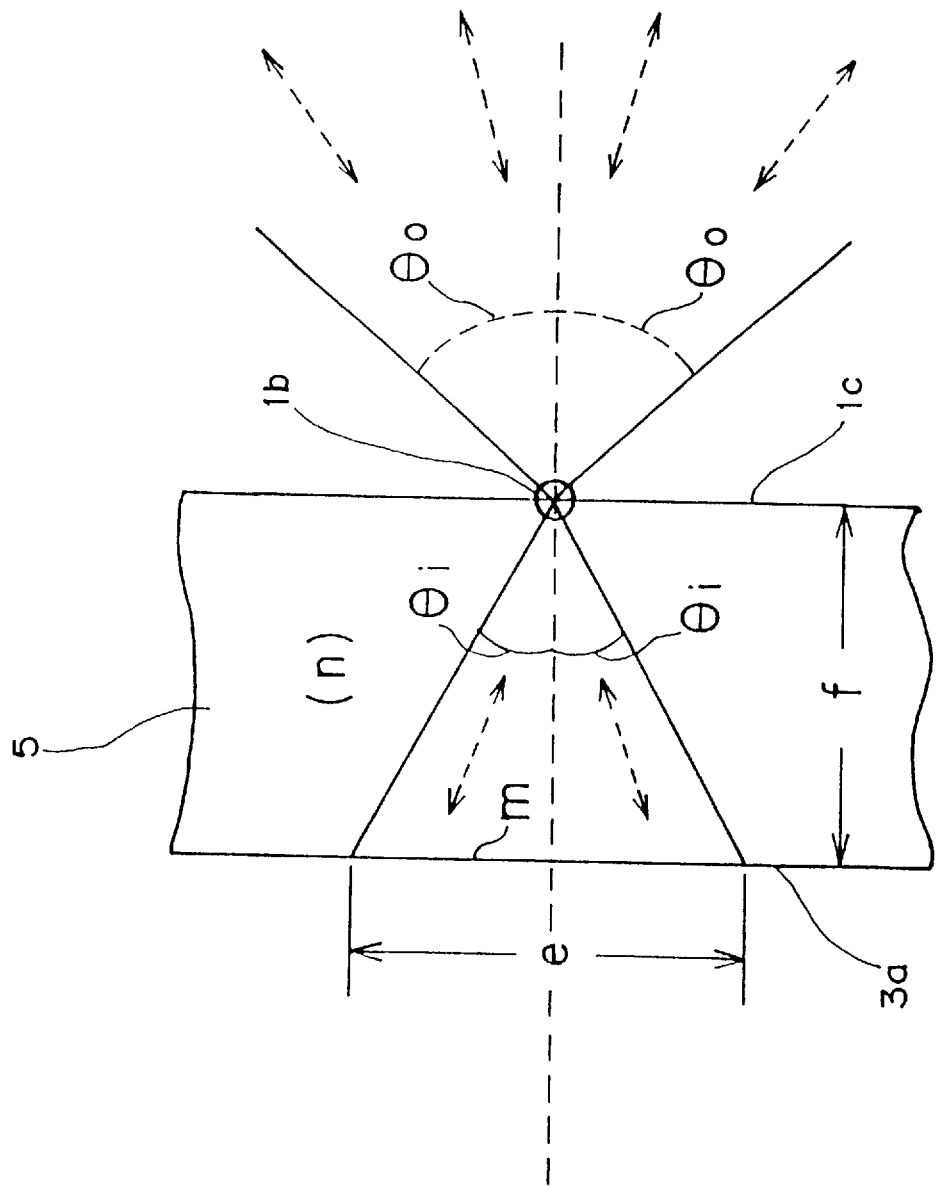
FIG. 24 shows the function of the spacer 5.

As shown in FIG. 24, the spacer 5 is interposed between the image display screen 3a and the slit arrangement 1c such that the image display screen 3a of the display unit 3 can face the slit arrangement 1c of the screen shutter unit 1 with a specified space interposed between them. The spacer 5 serves to maintain a constant space between the image display screen 3a and the slit arrangement 1c, to minimize the size of the image displayed on the image display screen 3a while maintaining the angle diverging outwards from the slit 1b, etc.. The angle $\theta_0$ of the rays output from the slit 1b after the image m displayed on the image display screen 3a has passed through the spacer 5 is determined by the size e of the image m corresponding to the slit 1b, the thickness f of the spacer 5, the refractive index n of the material of the spacer 5, etc.. For example, if e=10 mm, f=10 mm, and n=1.52, then the angle $\theta_i$ of the rays input to the slit 1b is 26.6° and the angle $\theta_0$ of the rays output from the slit 1c is 42.8°.

Figure 25:
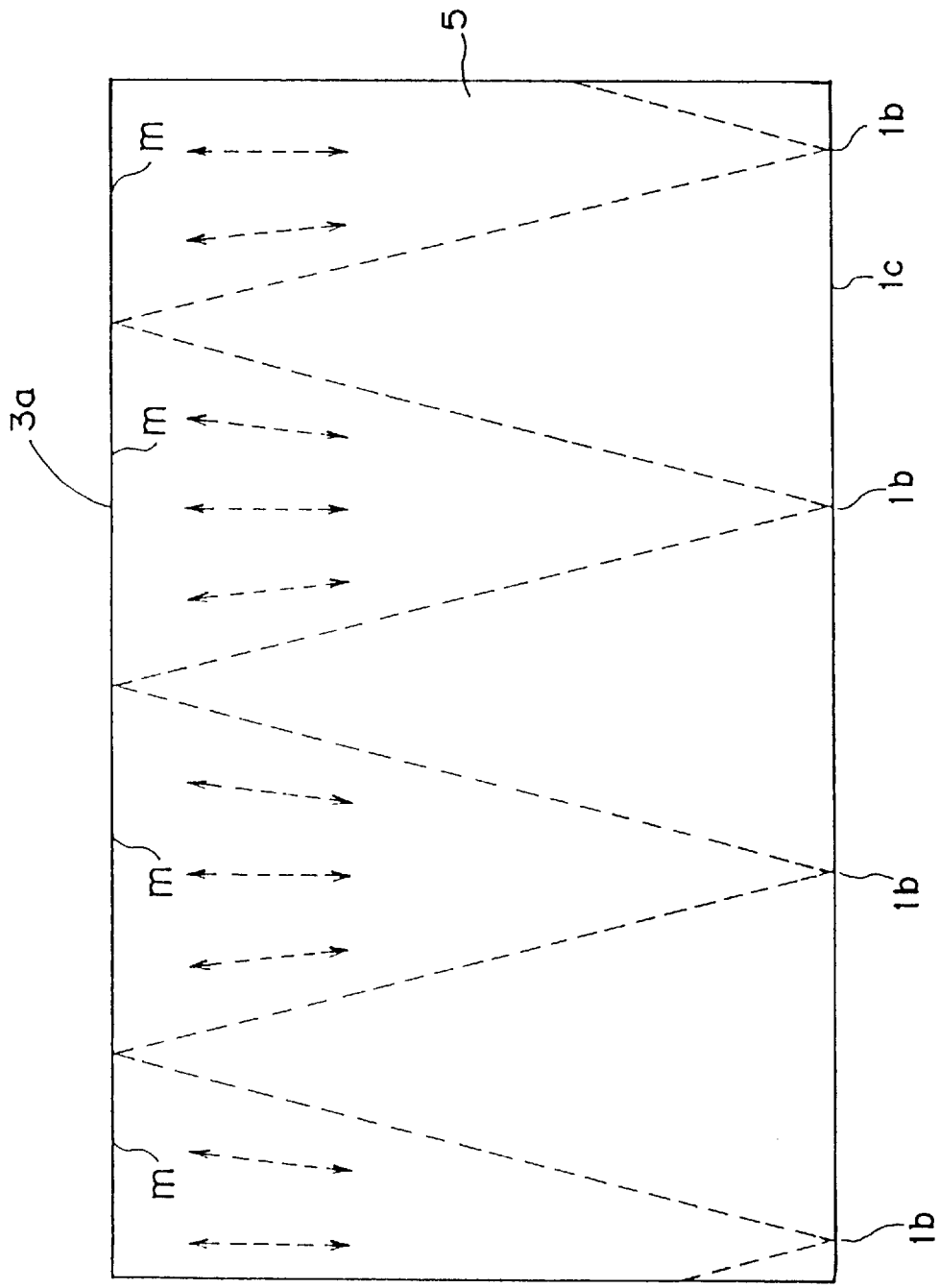
FIG. 25 shows the extension of the rays, which pass through a plurality of slits 1b, inside the spacer 5.

When the images m corresponding to respective slits 1b as shown in FIG. 25 are displayed on the image display screen 3a of the display unit 3 by the display control unit not shown in the attached drawings, each of the images m should be displayed such that images m corresponding to adjacent slits may not overlap each other. In FIG. 25, the boundaries of the areas in which the images m do not overlap each other are indicated by broken lines. The rays emitted from each point of the image m displayed on the image display screen 3a radiantly pass through the spacer 5, and a part of them get out of the slit 1b of the screen shutter unit 1 as shown in FIG. 24. The rays reach the viewer as displayed rays.

To display a desired three-dimensional image on the three-dimensional image display device $D_1$ according to method 1 with the above described configuration, the information about three-dimensional image M to be displayed is converted into image information for display of images m on the image display screen 3a of the display unit 3 by the computer-based ray tracing method as shown in FIG. 17. The image information is generated as one field screen information (the same as the field screen information W in FIG. 32 described later) corresponding to respective slits 1b of the screen shutter unit 1. The field screen information W is a video signal $V_1$ for one screen (1-field screen, that is, a plurality of images comprising a plurality of images m) to be displayed on the image display screen 3a, and is transmitted to the system control device F together with a slit pattern number U representing a slit pattern, that is, an arrangement of a plurality of slits (1b, 1b, . . . ) and a timing signal for use in synchronizing a switching timing of a field screen displayed on the image display screen 3a with a moving timing of the slits (1b, 1b, . . . ). A practical example of the field screen information is explained by referring to FIGS. 34 and 35.

How, description below refers to FIGS. 16 through 18 and 32.

The system control device F transmits the received information and signal (W,T, and U) by appropriately switching them by signal switching units $f_1$ and $f_2$ (FIG. 16). The video recording device G comprises a video recording device to be used with a common TV set provided with a function of recording a corresponding slit pattern number U for each field screen information W. For example, as shown in FIG. 32, the first through twentieth field screen information $W_1-W_{20}$ are recorded as being associated with the first through twentieth slit pattern numbers $U_1-U_{20}$.

Figure 32:
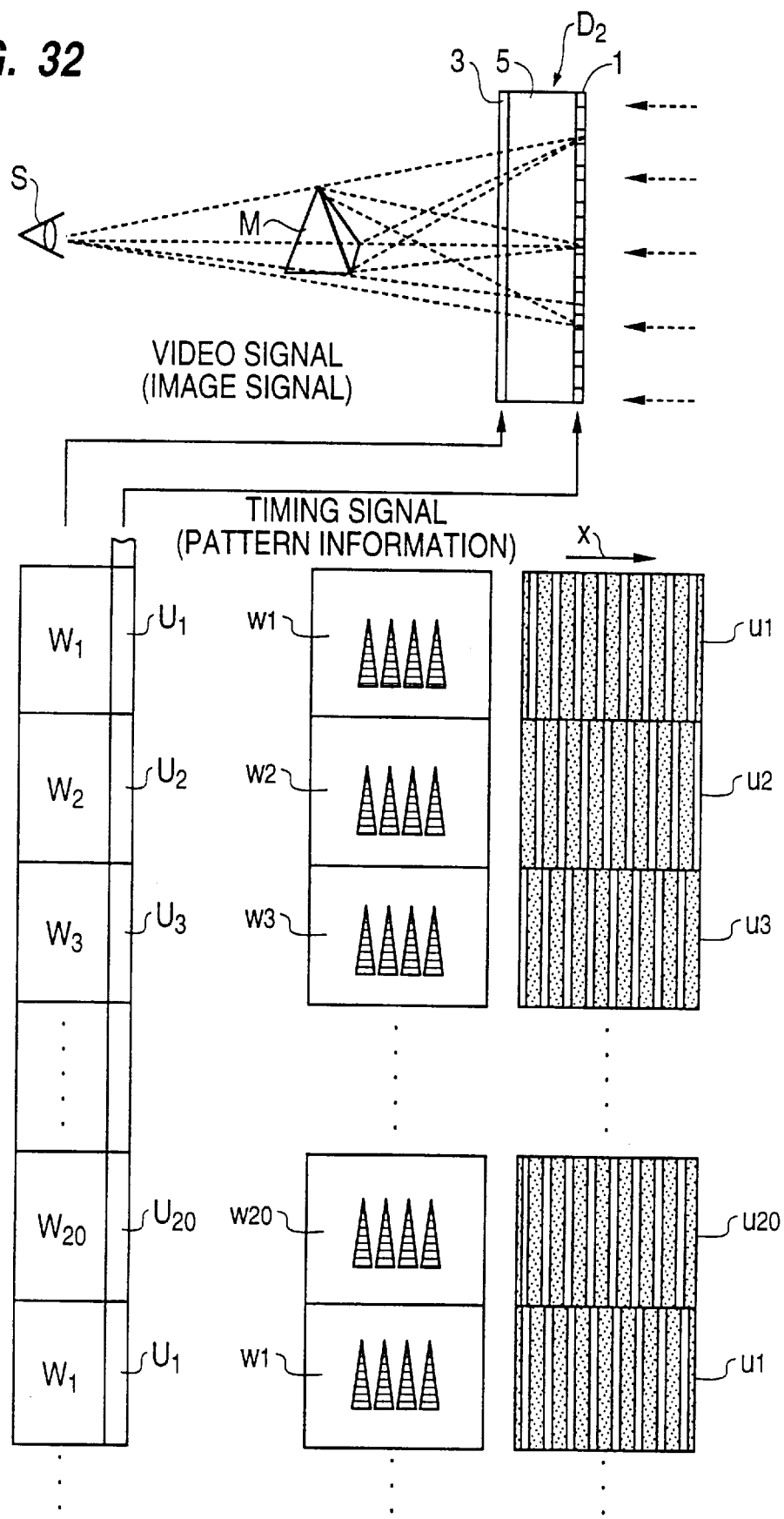
FIG. 32 shows the synchronized image between the screen shutter unit 1 and the display unit 3 of the display device $D_2$ of method 2.

The display device $D_1$ sequentially displays each of the field screens ($w_1-w_{20}$) based on a series of field screen information ($W_1-W_{20}$) in accordance with the timing signal T as shown in FIG. 32, and moves the slits (1b, 1b, . . . ) to the pattern positions (slit pattern $u_1-u_{20}$) corresponding to the field screen information. That is, the switching timing of a field screen displayed on the image display screen 3a and a moving timing of the slits (1b, 1b, . . . ) synchronize each other according to the timing signal T. The above described computer for generating and transmitting the above mentioned information and signals (W, T, and U) and the system control device F function as the shutter control unit 2 and the display control unit 4 shown in FIG. 1.

At one point, the viewer can observe a plurality of images of one screen displayed on the image display screen 3a through the slits (1b, 1b, . . . ). Then, a next slit pattern number U is received and the slits (1b, 1b, . . . ) are moved to the positions based on the slit pattern at a specified timing, for example, at time intervals of $\frac{1}{60}$ second as shown in FIG. 22B. Simultaneously, a plurality of images are displayed on the image display screen 3a in response to the field screen information W of the next one screen. Thus, the viewer can observe the images of one screen through the slits. If all field screens (20 field screens $w_1-w_{20}$ in FIG. 32) have been displayed, the viewer has observed the three-dimensional image spatially in series. The above described operations should be repeatedly performed to observe the three-dimensional image in time series. Furthermore, the screens corresponding to the movement of the three-dimensional object image should be displayed in order to display dynamic images.

Figure 26:
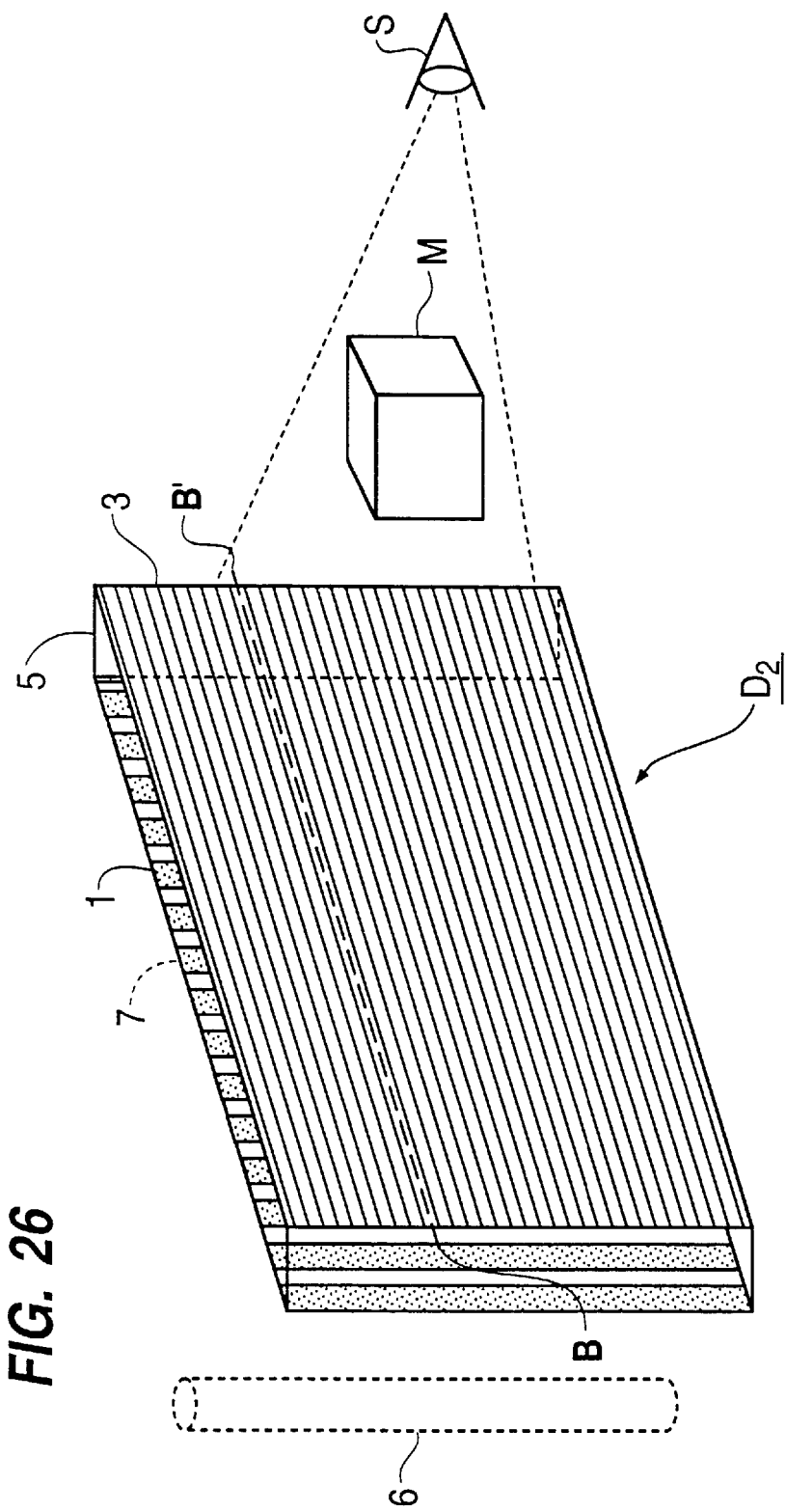
FIG. 26 is an oblique view showing an example of a practical configuration of the display device $D_2$ of method 2.
Figure 27:
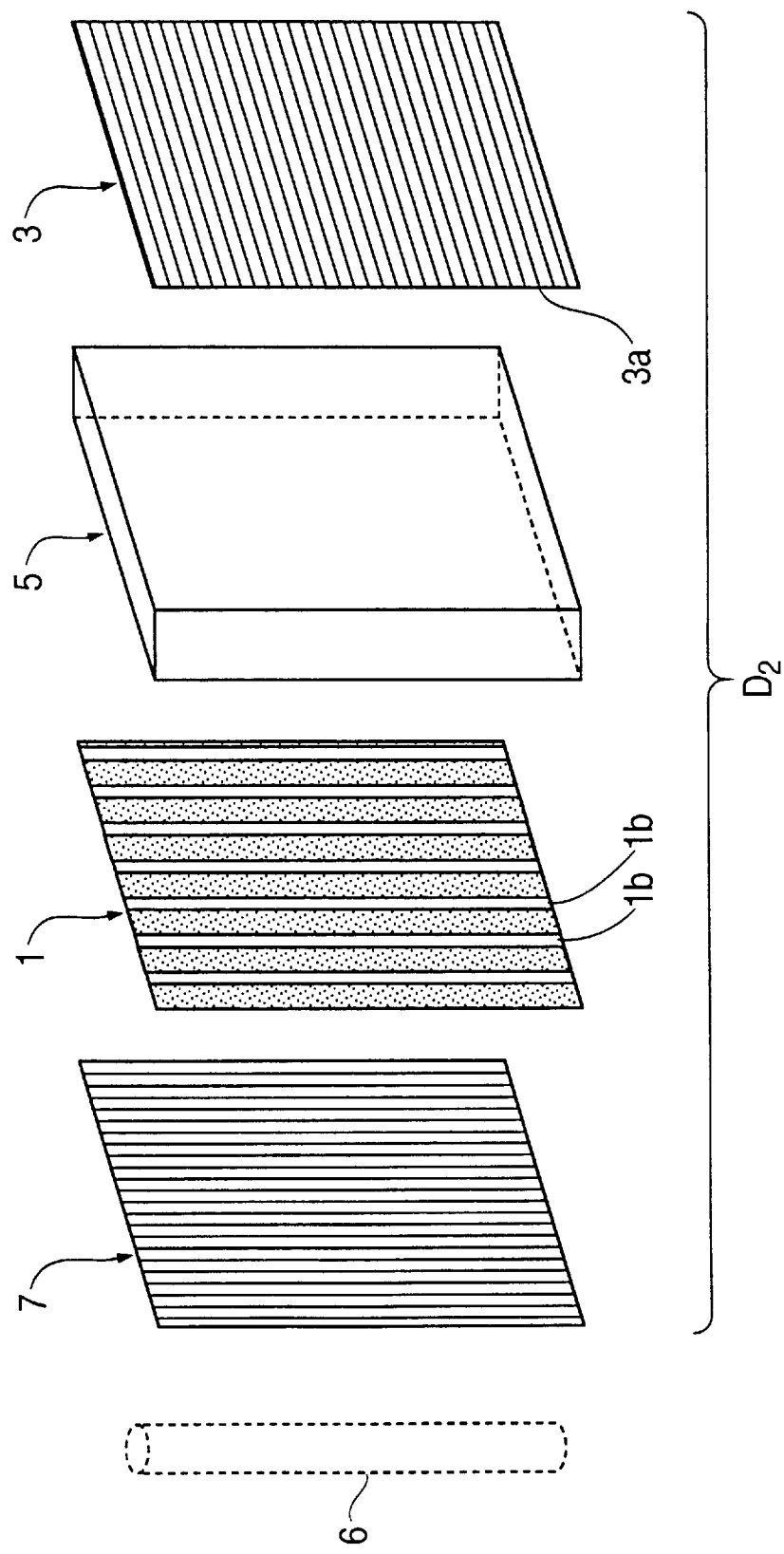
FIG. 27 shows the analytic configuration of the display device $D_2$ shown in FIG. 26.

Next, the display device $D_2$ of method 2 shown in FIG. 18 comprises a pass-through liquid crystal display device as the display unit 3, the screen shutter unit 1 behind the display device (as viewed from the viewer) with the spacer 5 of a specified thickness interposed between them, a ray scattering plate 7 of, for example, a transparent milky white acrylic plate, etc., positioned behind the screen shutter unit 1, for uniformly providing white light emitted from the light source for all over the screen shutter 1 as practically shown in FIGS. 26 and 27. All the components are put in one unit. With the configuration, the white rays are emitted from the light source, uniformed by the light scattering plate 7, and pass through the slit 1b of the screen shutter unit 1. The rays which have passed through the slit 1b are observed by the viewer through the image display screen 3a of the display unit 3 (pass-through liquid display device). Thus, the viewer recognizes the three-dimensional image M.

Figure 28:
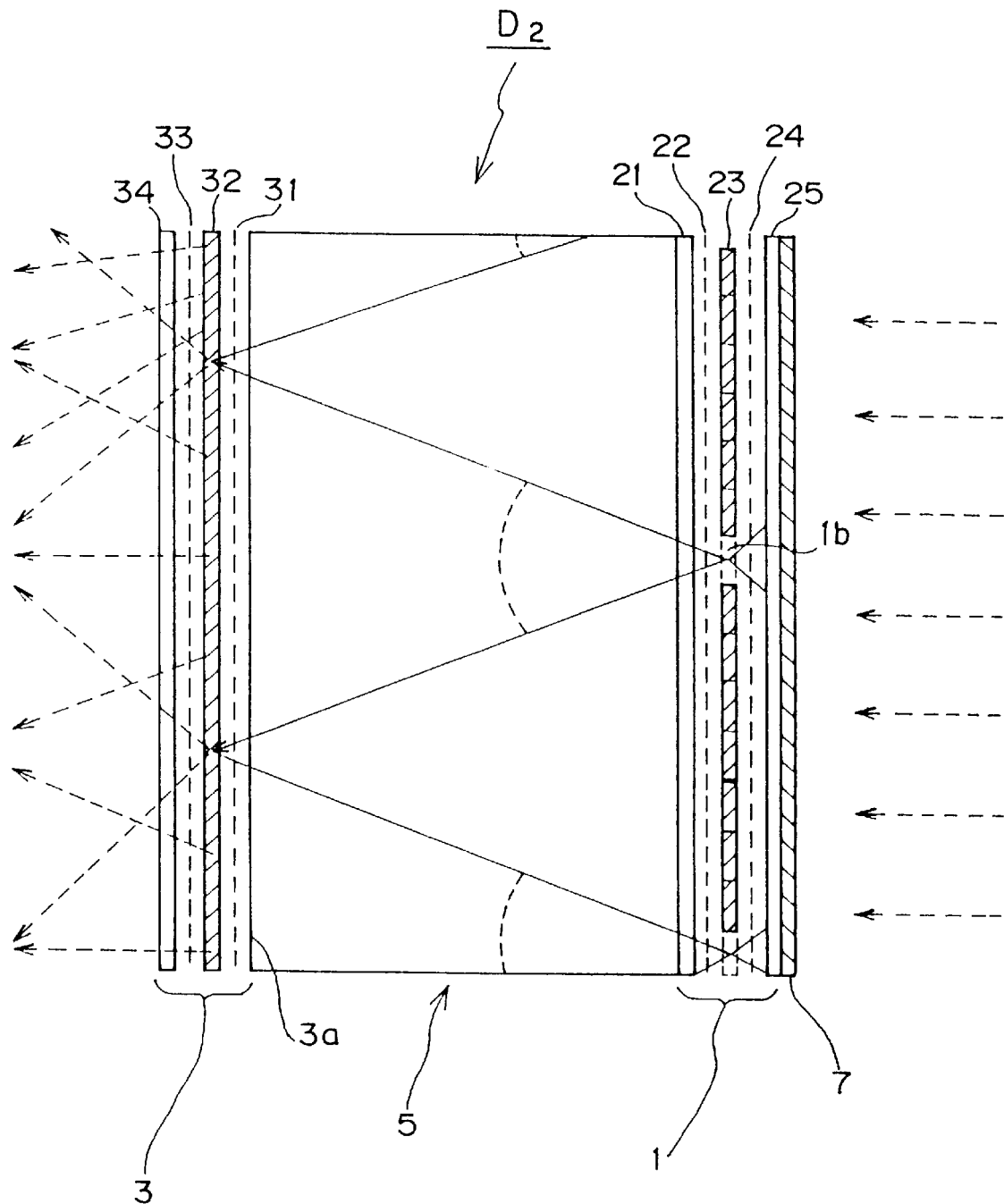
FIG. 28 is the cross-sectional view of a part of the display device $D_2$ of method 2 along the line B–B' in FIG. 26.

The pass-through liquid crystal display device is the display unit 3 and comprises a transparent electrode 31, a pass-through liquid plate 32, a transparent electrode 33, a polarizing plate 34, and a transparent glass plate, for protecting the outer surface of the polarizing plate 34, etc. (from the side of the spacer 5) as shown in FIG. 28 which is a cross-sectional view of a part of the display device $D_2$ along the line B–B' in FIG. 26. The spacer 5 and the screen shutter unit 1 is the same as that of the display device $D_1$ of method 1. The detailed explanation of the device is omitted here.

According to the display device $D_2$ of method 2 having the above described configuration, the white light is emitted from the light source on the right, passes through the slit 1b of the screen shutter unit 1, proceeds through the spacer 5 in the form of a fan horizontally, and passes through the image display screen 3a of the display unit 3 as shown in FIG. 28. The light is then filtered through the image displayed on the image display screen 3a and assigned color and strength. The image display screen 3a is a pass-through type and designed to minimize a scattering. Therefore, the rays which have proceeded in the form of a fan after the slit 1b reach the eyes of the viewer on the left without changing direction. That is, all rays that have passed through the image display screen 3a do not reach the eyes of the viewer, but a part of the rays reach them depending on the positions of the eyes of the viewer. In principle, it indicates that, among the rays from the image m displayed on the image display screen 3, only the rays passing through the slits 1b reach the viewer.

Figure 29:
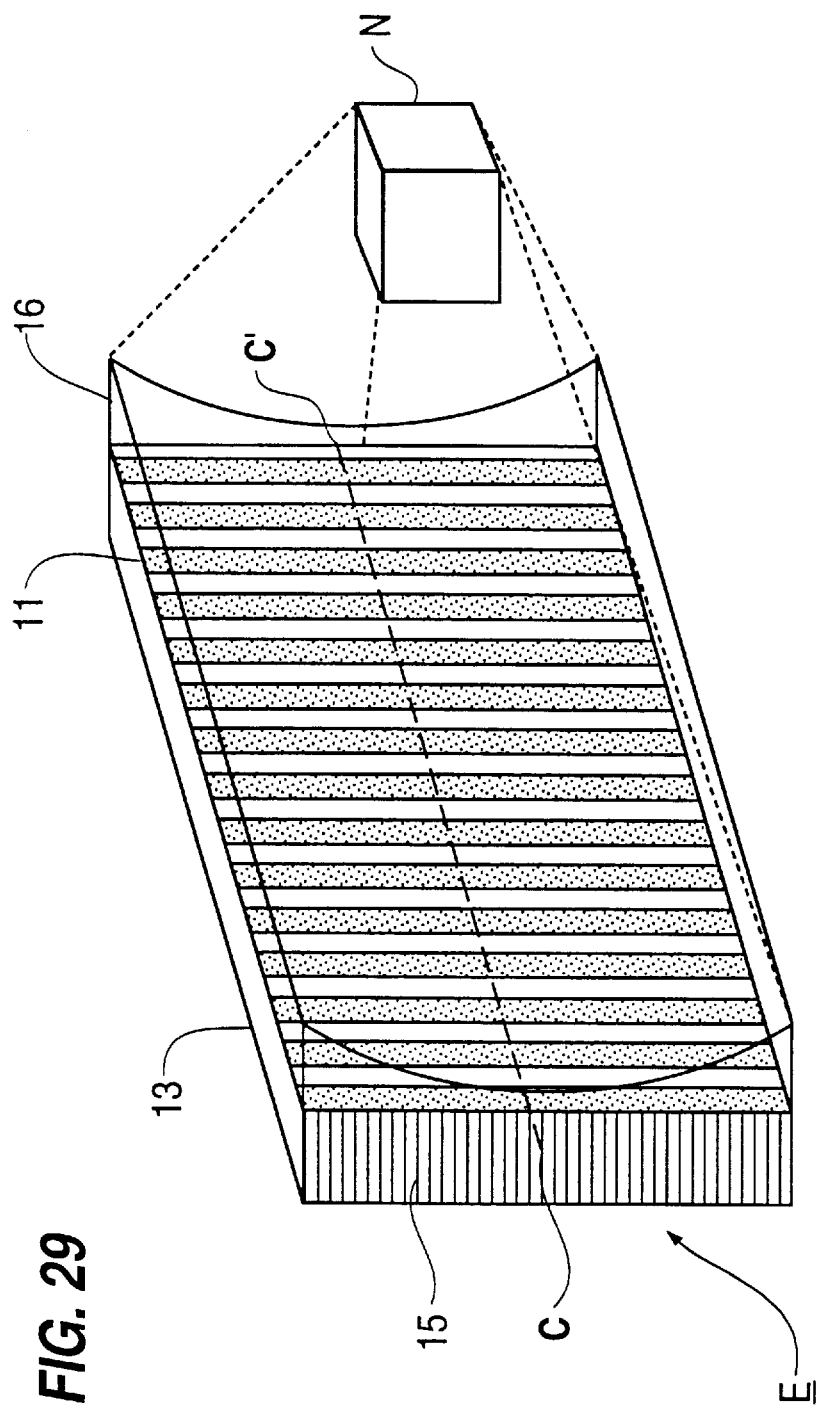
FIG. 29 is the oblique view showing an example of a practical configuration of the image recording device E.
Figure 30:
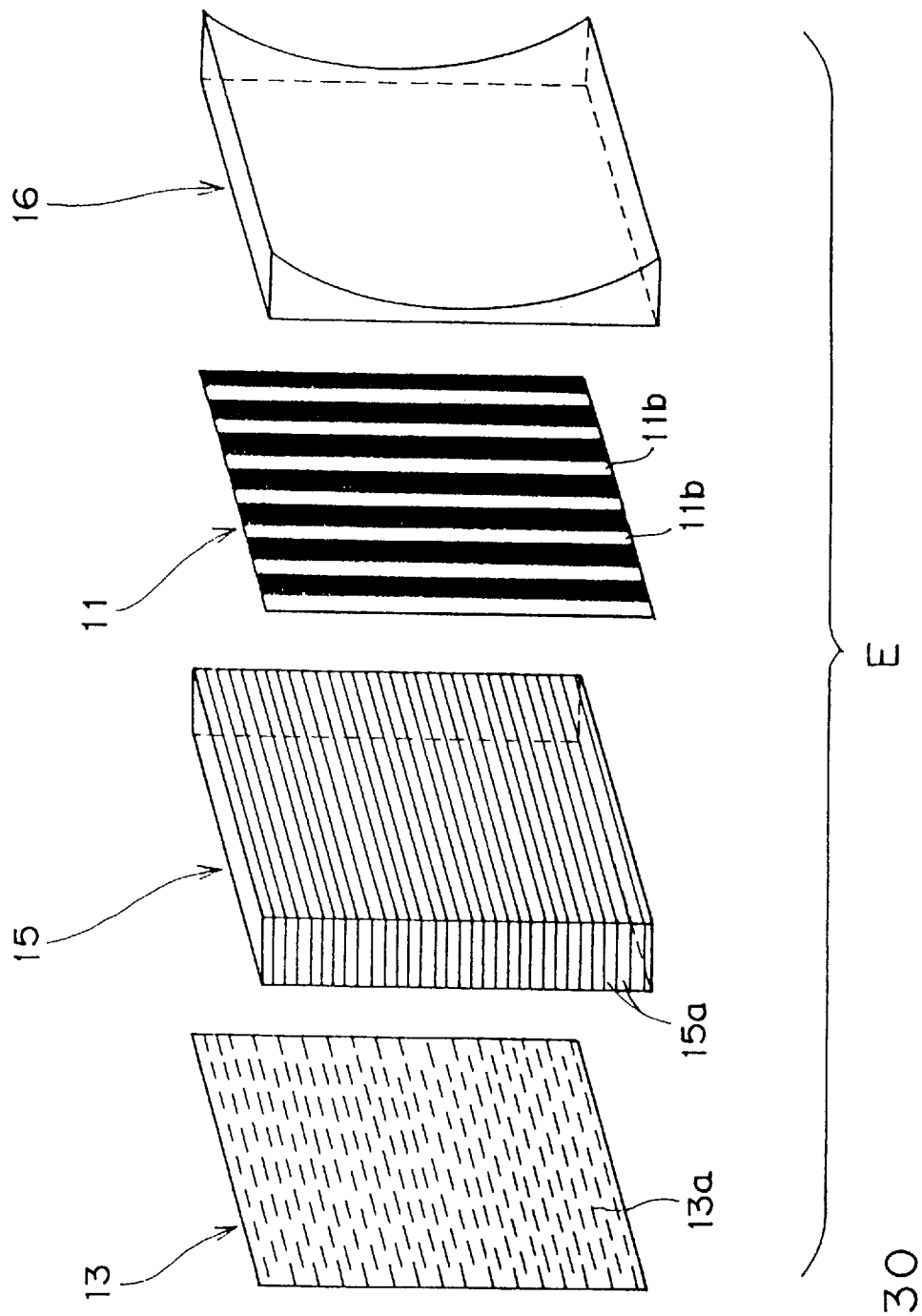
FIG. 30 is the analytic configuration of the image recording device shown in FIG. 29.

In the image recording device E shown in FIG. 29, a screen shutter unit 11 comprising a plurality of liquid crystal shutters is provided before a recording unit 13 comprising CCDs (on the side of the three-dimensional object N to be recorded) with a ray path restricting unit 15 comprising a pile of horizontal layers as practically shown in FIGS. 29 and 30. Furthermore, a lens 16 for adjusting the vertical diverging angle is provided before the screen shutter unit 11. All these component are put in one unit.

Figure 31:
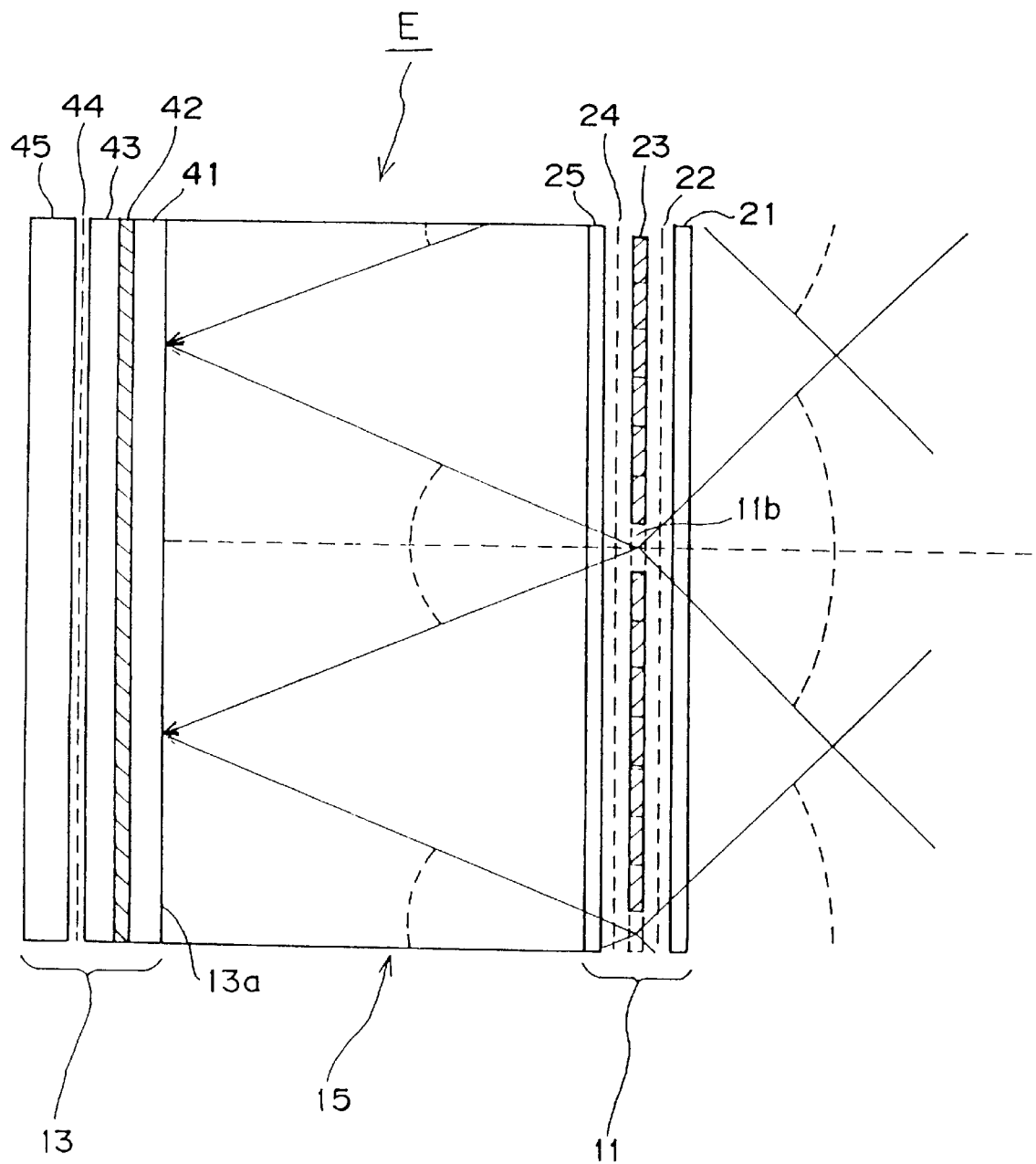
FIG. 31 is the cross-sectional view of a part of the image recording device E along the line C–C' in FIG. 29.

The CCD receiving plate forming part of the recording unit 13 comprises a receiver unit 41, a gate 42, a transmitter unit 43, an electrode 44, and a glass plate 45, etc. as viewed from the ray input side as shown in FIG. 31 which is a cross-sectional view of a part of the image recording device E along the line C–C' in FIG. 29. The image shutter unit 11 can be the screen shutter unit 1 used in display devices $D_1$ and $D_2$. Therefore, the detailed explanation of the image shutter unit 11 is omitted here.

The lens 16 adjusts the vertical diverging angle as described above. The type of the lens depends on the particular purpose. That is, a concave lens is used when an object or a scene to be recorded is larger than the upper or lower limit of the screen, whereas a convex lens is used when a three-dimensional image should be recorded as appearing in three dimensions before the screen.

The ray path restricting unit 15 is a horizontal pile of a plurality of transparent plates 15a as shown in FIG. 30. The transparent plates 15a can be, for example, thin glass sheets having parallel surfaces as boundaries between adjacent plates. Each of the transparent plates 15a is made of glass plate of a specified thickness with both surfaces covered with a high-refractive material and with a final process to suppress the internal reflection on the boundary. The ray path restricting unit 15 has a specified thickness and also functions as a spacer for maintaining a certain space between the slit arrangement of the screen shutter unit 11 and the image recording screen 13a of the recording unit 13.

The above described image recording device E receives from the right side a plurality of recording rays from a three-dimensional object to be recorded as shown in FIG. 31. If the rays pass through the ray path restricting unit 15, the direction of the path of the rays which pass through the slits 11b of the screen shutter unit 11 is limited to the horizontal direction on the screen. Only the components parallel to the plane vertical to the length of the slits 11b reach the image recording screen 13a of the recording unit 13 where images are generated. The images are recorded by the recording unit 13 as video signals as in the case of a common VTR camera. On the image recording screen 13a, a recording scope should be small enough to prevent the images corresponding to adjacent slits from overlapping each other.

In FIG. 18, image information (video signal $V_1$) obtained by converting the CG information by the computer-based ray tracing method as in the case shown in FIG. 17 is used, and image information (video signal $V_2$) obtained by the image recording device E is used to display a desired three-dimensional image on the three-dimensional image display device $D_2$ of method 2. The image information is transmitted to the system control device F as field screen information W together with the slit pattern number U and the timing signal T as in the system of method 1 shown in FIG. 17.

As in the case shown in FIG. 17, the system control device F appropriately switches received information and signals (W, T, and U) through the signal switching units $f_1$ and $f_2$ (shown in FIG. 16), and transmits them to the video recording device G and the display device $D_2$.

The display device $D_2$ sequentially displays on the image display screen 3a a series of field screens ($w_1$–$w_{20}$) based on field screen information W ($W_1$–$W_{20}$) according to a timing signal T as shown in FIG. 32. The display device $D_2$ also moves the slits (1b, 1b, . . . ) to the pattern positions (slit patterns $u_1$–$u_{20}$) according to the slit pattern numbers U ($U_1$–$U_{20}$) corresponding to the field screen information. The above described displaying operation is explained below by referring to the flowchart shown in FIG. 33 with an example of displaying a single static image.

First, in step 1, the system is initialized and assigned the premises. In this example, a field number n indicates the number of a field screen to be displayed. The initial value n equals 0. As in the example shown in FIG. 22, the width a of the screen is 500 mm, the interval b of slits is 10 mm (that is, the number of slits per slit pattern is 50), the time interval t in displaying one field screen is ⅙₀th second (the same as TV), the number of field screens required to display an entire static screen is 20(that is, one static screen is displayed in ⅓rd second), the slit divergence width c of one slit is 0.25 mm, and the movement width d of the slits is 0.5 mm. The number of the slit patterns is 20 ($u_1$–$u_{20}$), and a slit pattern moves to the right (in the X direction) by 0.5 mm corresponding to the field number n.

Then, after the field number n is incremented by 1 in step 2, the slit pattern for the field number n is determined in step 3. That is, the slit pattern number corresponding to the field number n ($U_1$ if n=1, and $U_{20}$ if n=20) is transmitted also as a timing signal T, and the screen shutter unit 1 is assigned a slit pattern corresponding to the slit pattern number ($u_1$ for $U_1$ and $u_{20}$ for $U_{20}$). The slit pattern moves in parallel to the right by ½₀th of the separation b of the slits each time the field number n increases by 1.

Then, in step 4, the field screen is displayed corresponding to the slit pattern of the field number n. That is, the field screen information corresponding to the field number n ($W_1$ if n=1 and $W_{20}$ if n=20) is transmitted as being synchronized with the timing signal T, and the field screen is displayed on the image display screen 3a according to the field screen information. One field screen comprises a plurality of different image segments corresponding to respective slits. At this point, the viewer sees the linear white light rays emitted through the slits and filtered through the image segments displayed on the display unit 3 (transparent liquid display device). The viewer recognizes a part of the three-dimensional image M. Each time the field number n increases by 1, the field screen is refreshed and the viewer can recognize another part of the three-dimensional image M.

In step 5, the processes in steps 2 through 4 are repeatedly performed while it is determined, until n indicates 20, whether the field number n has reached 20. If all the series of field screens $w_1$–$w_{20}$ have been displayed, the viewer has completely observed the three-dimensional image spatially in series. The above described processes should be repeated to observe the three-dimensional image in time series.

If the image captured by the image recording device E is regenerated by the display device $D_2$, then the image is regenerated at the same position of the image as captured by the image recording device E. If the image is captured such that a real image is generated behind the image recording screen of the image recording device E, then it appears in three dimensions before the screen when it is regenerated by the display device $D_2$.

Described below is a method of generating image information by the computer system shown in FIGS. 16 and 17 by referring to an example of generating field screen information for use in displaying a three-dimensional static image. The explanation is based on the flowchart shown in FIG. 34.

The system is initialized in step 11. Information about a three-dimensional image to be displayed is entered. Since the image is not represented in three dimensions in the vertical direction, determined is the height of the point of view in generating an image. At this time, the thickness and the refractive index of the spacer 5 used in the display device should be carefully considered. "p" indicates the field number of the field screen information to be generated. The initial value is "0".

In step 12, the field number P is incremented by 1. Then, in step 13, "q" indicates the slit number corresponding to the image segment to be generated in a field screen.

After the slit number q is incremented by 1 in step 14, the x coordinate of the slit corresponding to the field number p and the slit number q is determined in step 15. FIG. 35 shows an example of the process in step 15. That is, in this process, "p" indicates a field number, "q" indicates a slit number, "a" indicates the width of a screen, "b" indicates the interval of slits, and "d" indicates the interval of the movement of the slits in step 21. For example, in an example of the shutter shown in FIG. 22, the field number p is 1–20, the width a of the screen is 500 mm, the interval b of the slits is 10 mm, the interval d of the movement of the slits is b/20=0.5 mm, and the slit number q is 1–50 (=a/b). Then, in step 21, the x coordinate of the slit is obtained by the following equation.

$$x=(q-1)b+(p-1)d$$

Thus, based on the obtained x coordinate of the slit, an image segment corresponding to the x coordinate is generated in step 16. That is, using the technology of perspective drawings, the two-dimensional image information indicating the same image as the image segment is generated (two-dimensional image) by projecting the three-dimensional image to be displayed on the image display screen through the slit having the above described x coordinate.

It is determined whether or not the slit number q indicates the last number (50 in the example above) in step 17. The processes in steps 14 through 16 are repeatedly performed until the slit number q indicates the last number. Thus, generated is one field screen information containing 50 pieces of image segments. The field image information is recorded onto video tape in step 18.

It is determined whether or not the field number p indicates the last number 20 in step 19. The processes in steps 12–18 are repeatedly performed until the field number p indicates 20. Thus, obtained are 20 pieces of field screen information required to display an entire static three-dimensional image. Since one slit corresponds to one image segment, a total of 20×50=1,000 image segments are generated according to this example.

Figure 33:
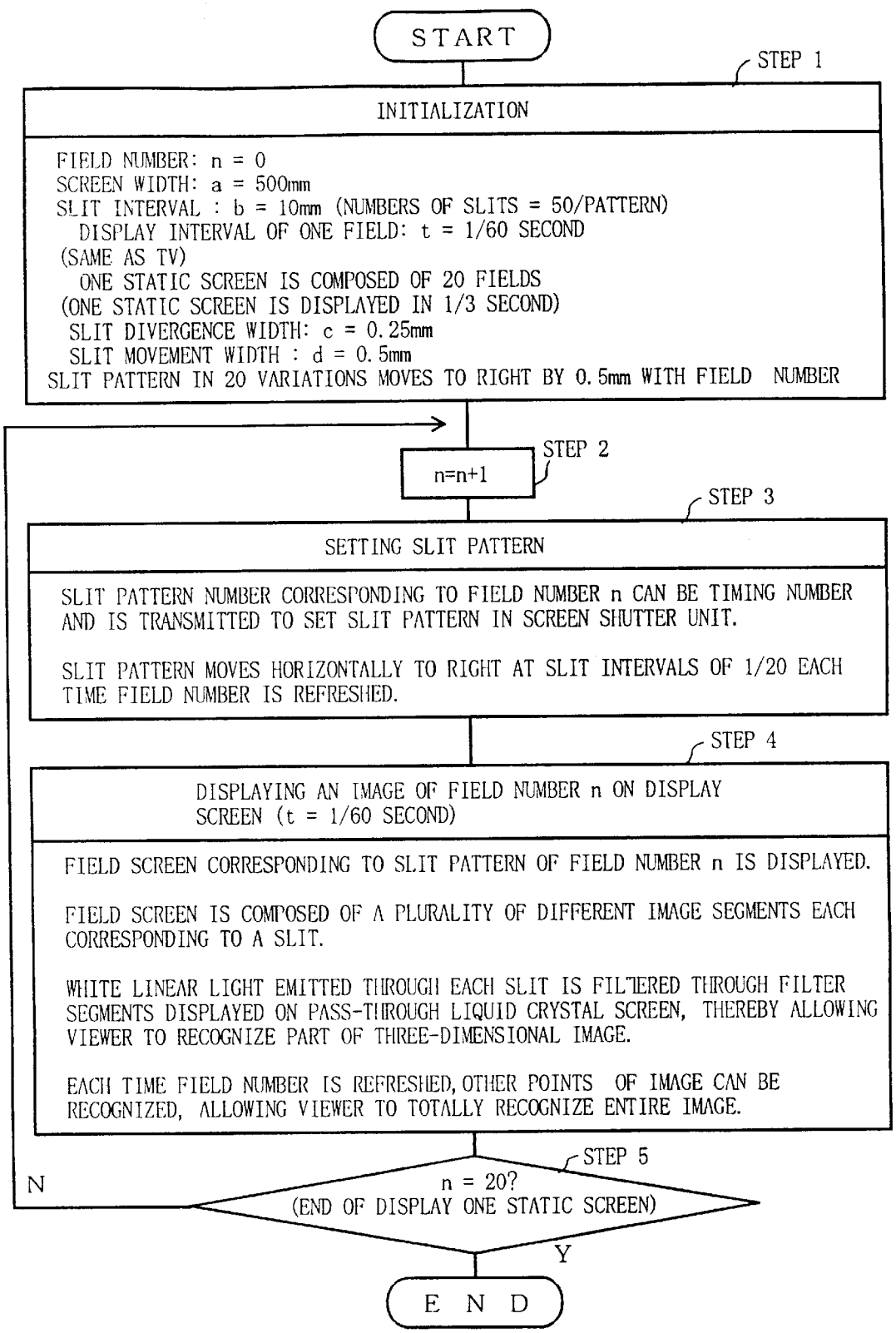
FIG. 33 is the flowchart showing an example of displaying an image on the display device $D_2$ of method 2.
Figure 34:
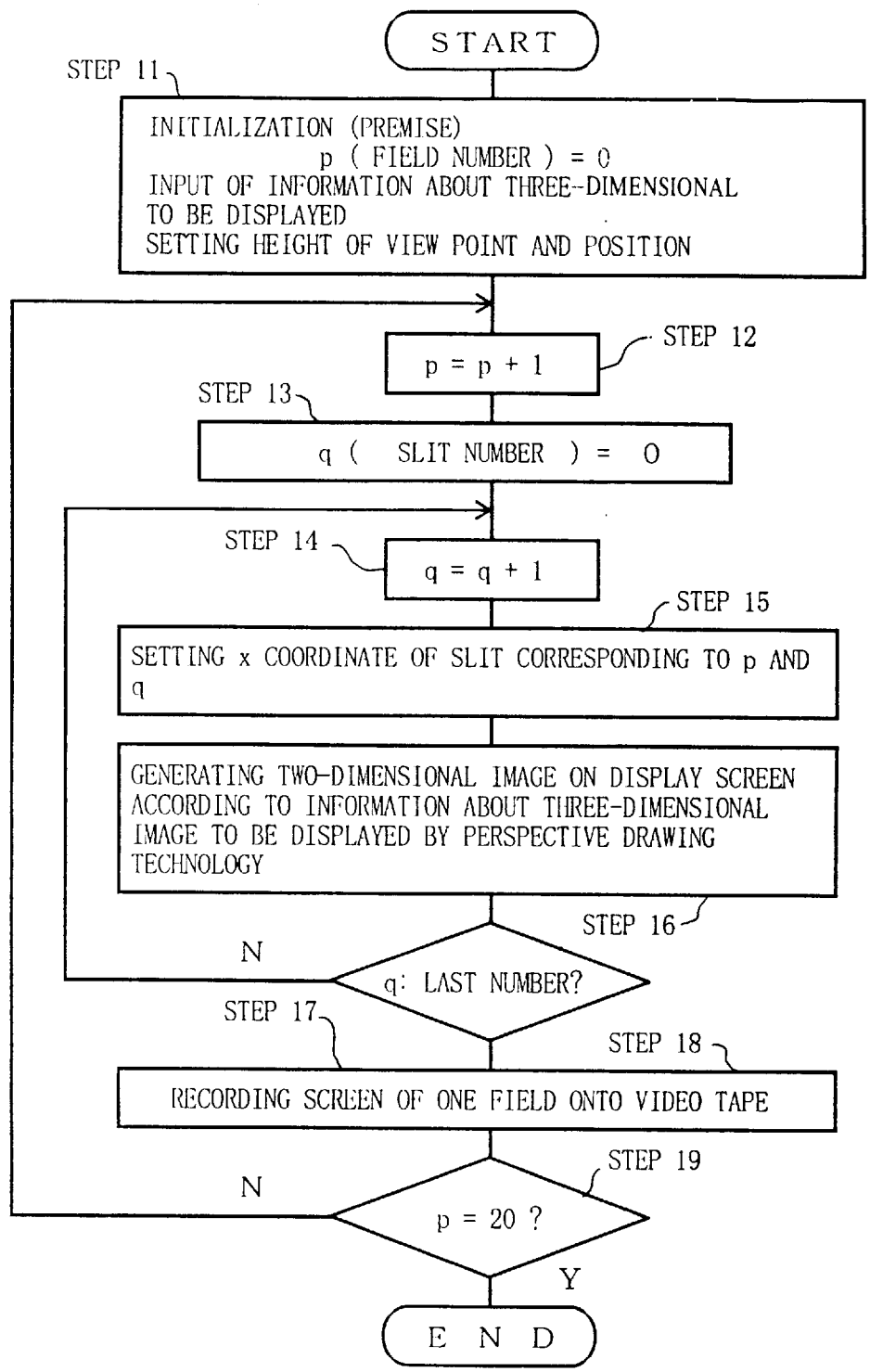
FIG. 34 is the flowchart showing an example of generating field screen information by a computer system.

It is obvious that the processes shown in FIGS. 33 and 34 are examples only, and the present invention is not limited to this application.

According to the three-dimensional image display device of the present invention, a viewer can observe an image in three dimensions, as if it were a hologram, from different view points by viewing the image from the left and right sides. A plurality of viewers can simultaneously enjoy the image without special glasses. However, since the viewers require no special glasses, they are free of the nuisances of glasses and enjoy three-dimensional images in natural postures.

The image information for display in three dimensions can be easily generated through perspective drawings. Accordingly, there is no need to follow the conventional complicated procedures of, for example, holograms in which an image is converted into and recorded as the stripes of light interference. Thus, a shorter time is taken for the generation of image information, thereby successfully realizing a practical method of displaying three-dimensional images. Furthermore, displaying dynamic images requiring a great amount of image information can be easily performed, and the images can also be displayed in various colors.

According to the three-dimensional image recording device of the present invention, only capturing and recording a natural object allows the three-dimensional image of the object to be easily regenerated by the three-dimensional image recording device. Furthermore, as compared with the conventional integral photography, the dimension and installment of each material are not strictly defined between a recording time and a regenerating time. Therefore, the three-dimensional images can be easily generated and perfectly regenerated in three dimensions from recorded images.

In the above described embodiments, the configurations of the shutter control unit, the display control unit, the recording control unit, the system control device of the three-dimensional image recording and regenerating system, etc. are not explained in detail. However, the configurations can be easily realized by one of ordinary skill in the art according to his or her common knowledge of technologies involved.

What is claimed is:

1. A three-dimensional image display device for displaying a three-dimensional image to a viewer, comprising:
   screen shutter means having a plurality of long and narrow shutters for passing and intercepting light rays;
   shutter control means for selecting shutters from the plurality of shutters at predetermined intervals as long slits to pass light rays through, and for moving the slits in a direction different from a longitudinal direction of said shutters at predetermined time intervals;
   display screen means for displaying image segments, each corresponding to one of the slits, on an image display screen provided at a predetermined distance from said shutters; and
   display control means for controlling said display screen means to display a plurality of images as the slits are moved by said shutter control means, each image formed by the image segments displayed at respective positions on the image display screen corresponding to respective slits synchronously with a moving timing of the slits controlled by said shutter control means, so that several of the image segments displayed on the image display screen pass through the slits and reach eyes of viewers, thereby allowing the viewers to recognize the three-dimensional image which is continuous in time and space according to an afterimage effect of the eyes perceiving the images through the slits during movement of the slits.

2. The three-dimensional image display device according to claim 1, wherein said display screen means is a self-emitting image display unit whose image display screen emits rays itself, said screen shutter means being interposed between the image display screen and a viewer, and a part of rays emitted from the image display screen reaching the viewer's eyes through each slit of said screen shutter means.

3. The three-dimensional image display device according to claim 1, wherein said display screen means is a pass-through display device in which light rays from a light source provided behind the image display screen are filtered through the image display screen and pass through the image display screen, said screen shutter means being interposed between the image display screen and the light source, a part of the rays from the light source passing through each slit of said screen shutter means and reaching the viewer's eyes through the image display screen.

4. The three-dimensional image display device according to claim 3, wherein said display screen means is a pass-through liquid crystal device comprising:
a pass-through liquid crystal plate;
transparent electrodes with said pass-through liquid crystal plate interposed between them; and
a polarization plate provided beyond one of said transparent electrode.

5. The three-dimensional image display device according to claim 3, wherein a scattering plate is interposed between said screen shutter means and the light source.

6. The three-dimensional image display device according to claim 1, wherein the image display screen of said display screen means and the arrangement of the shutters of said screen shutter means face each other with a transparent spacer of a predetermined thickness interposed between them.

7. The three-dimensional image display device according to claim 1, wherein said shutter is an electronic shutter of liquid crystal or ceramic.

8. The three-dimensional image display device according to claim 1, wherein each image displayed on said image display screen is generated by a ray tracing method according to three-dimensional image information generated by computer graphics and information about height of viewer's eyes.

9. The three-dimensional image recording device according to claim 1 wherein each of said shutters is positioned vertically and arranged parallel to each other at equal separation in a plane and said slits are moved horizontally.

10. The three-dimensional image display device according to claim 1, wherein the width of the shutters is uniform.

11. The three-dimensional image display device according to claim 1, wherein said shutter control means horizontally moves entire slits at predetermined time intervals and movement intervals.

12. The three-dimensional image display device according to claim 1, wherein parts of the images displayed on the image display screen for each of the movement positions of the slits are selected through respective slits and reach the viewer's eyes, thereby allowing the viewer to recognize each part of the three-dimensional image.

13. The three-dimensional image display device according to claim 12, wherein when the slits have moved in series to a predetermined position, the viewer is allowed to recognize an entire image composed of each point of the three-dimensional image through an effect of afterimage.

14. The three-dimensional display device according to claim 1, wherein said screen shutter means is a liquid crystal shutter device comprising:
a liquid crystal plate;
transparent electrodes with said liquid crystal plate interposed between them; and
a polarization plate provided beyond said transparent electrodes.

15. The three-dimensional image display device according to claim 1, wherein said image displayed on the display screen comprises plane images.

16. The three-dimensional image display device according to claim 1, wherein said image displayed on the display screen comprises plane images: wherein a difference in vision between left and right eyes obtained from a first portion of a plane image displayed on the image display screen and obtained by a viewer through a first set of slits is different from a difference in vision between left and right eyes obtained from a second portion of the plane image displayed on the image display screen and obtained by the viewer through a second set of slits.

17. A three-dimensional display apparatus, comprising:

a shutter controller producing moving shutter slits; and a display controller coupled to said shutter controller and producing a three-dimensional image projected through the moving shutter slits with image portions synchronously coordinated with the moving shutter slits to project different images, each image formed of image segments corresponding to positions of the shutter slits, as the shutter slits move and allowing viewers to recognize the three-dimensional image as continuous in time and space according to an afterimage effect of eyes perceiving the different images through the shutter slits during movement of the slits.

18. A three-dimensional display method, comprising:

producing moving shutter slits; and projecting a three-dimensional image through the moving shutter slits with image portions synchronously coordinated with the moving shutter slits to project different images, each image formed of image segments corresponding to positions of the shutter slits, as the shutter slits move and allowing viewers to recognize the three-dimensional image as continuous in time and space according to an afterimage effect of eyes perceiving the different images through the shutter slits during movement of the slits.

* * * * *

UNITED STATES PATENT AND TRADEMARK OFFICE
CERTIFICATE OF CORRECTION

PATENT NO.  :   5,880,704
DATED       :   March 9, 1999
INVENTOR(S) :   Takezaki It is certified that error appears in the above-identified patent and that said Letters Patent is hereby corrected as shown below:

Col. 8, line 19, "et" should be --a--.

Col. 11, line 35, delete ":"

Signed and Sealed this

Nineteenth Day of October, 1999

Attest:

Q. TODD DICKINSON

Attesting Officer

Acting Commissioner of Patents and Trademarks